(12) United States Patent
Trivellato et al.

(10) Patent No.: US 11,277,431 B2
(45) Date of Patent: Mar. 15, 2022

(54) COMPREHENSIVE RISK ASSESSMENT

(71) Applicant: FORESCOUT TECHNOLOGIES, INC., San Jose, CA (US)

(72) Inventors: Daniel Trivellato, Eindhoven (NL); Emmanuele Zambon-Mazzocato, Helmond (NL)

(73) Assignee: Forescout Technologies, Inc., San Jose, CA (US)

( * ) Notice: Subject to any disclaimer, the term of this patent is extended or adjusted under 35 U.S.C. 154(b) by 82 days.

(21) Appl. No.: 16/454,729

(22) Filed: Jun. 27, 2019

(65) Prior Publication Data
US 2020/0412758 A1  Dec. 31, 2020

(51) Int. Cl.
*H04L 29/06* (2006.01)

(52) U.S. Cl.
CPC ...... *H04L 63/1433* (2013.01); *H04L 63/1441* (2013.01)

(58) Field of Classification Search
CPC .................. H04L 63/1433; H04L 63/1441
See application file for complete search history.

(56) References Cited

U.S. PATENT DOCUMENTS

| | | | |
|---|---|---|---|
| 9,747,570 B1 | 8/2017 | Vescio | |
| 10,536,475 B1* | 1/2020 | McCorkle, Jr. | ........ H04W 12/12 |
| 2007/0067846 A1* | 3/2007 | McFarlane | ............ G06F 21/577 726/25 |
| 2013/0191919 A1* | 7/2013 | Basavapatna | ....... H04L 63/1408 726/25 |
| 2015/0067143 A1* | 3/2015 | Babakhan | ............... H04L 63/20 709/224 |
| 2016/0292464 A1* | 10/2016 | Alarabi | ................. H04W 12/12 |
| 2016/0294800 A1* | 10/2016 | Oppenheim, Jr. | .. G06F 16/2455 |
| 2016/0330228 A1* | 11/2016 | Knapp | ................ H04L 63/1433 |
| 2016/0359895 A1* | 12/2016 | Chiu | ................... H04L 63/1433 |
| 2016/0373478 A1* | 12/2016 | Doubleday | ............... G06F 8/65 |
| 2020/0244698 A1* | 7/2020 | Pal | ...................... H04L 63/1433 |
| 2020/0252422 A1* | 8/2020 | Davis | ..................... G06F 21/31 |

FOREIGN PATENT DOCUMENTS

| | | |
|---|---|---|
| WO | 2016178824 A1 | 11/2016 |
| WO | 2016196820 A1 | 12/2016 |

OTHER PUBLICATIONS

The International Search Report and Written Opinion for PCT Application No. PCT/US2020/036008 dated Aug. 31, 2020.

* cited by examiner

*Primary Examiner* — Meng Li
(74) *Attorney, Agent, or Firm* — Womble Bond Dickinson (US) LLP

(57) ABSTRACT

Systems, methods, and related technologies for determining a comprehensive risk score or value are described. The risk score determination may include selecting an entity communicatively coupled to a network and determining a cyber-attack likelihood value and a cyber-attack impact value associated with the entity. A cyber-attack risk may then be determined based on the cyber-attack likelihood value and a cyber-attack impact value associated with the entity. An operational failure likelihood value and an operational failure impact value associated with the entity can be determined. An operational failure risk based on the operational failure likelihood value and the operational failure impact value associated with the entity can be determined. A risk value may then be determined for the entity based on the cyber-attack risk and the operational failure risk and the risk value for the entity can be stored.

21 Claims, 10 Drawing Sheets

COMPREHENSIVE RISK ASSESSMENT

TECHNICAL FIELD

Aspects and implementations of the present disclosure relate to network monitoring, and more specifically, determining risk associated with systems and resources communicatively coupled to a network.

BACKGROUND

As technology advances, the number and variety of devices that are connected to communications networks are rapidly increasing. Each device may have its own respective vulnerabilities which may leave the network open to compromise or other risks. Preventing the spreading of an infection of a device or an attack through a network can be important for securing a communication network.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
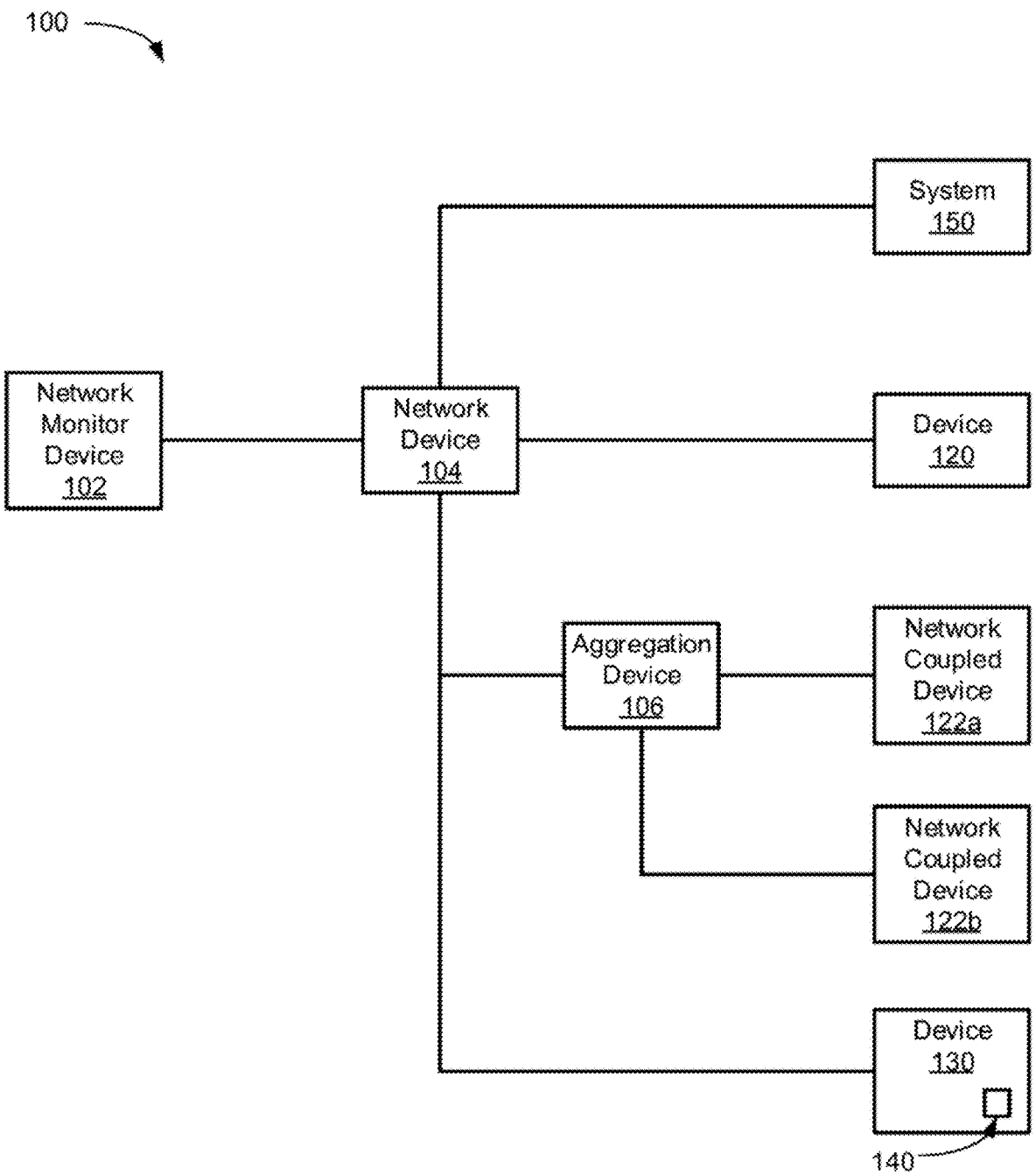
FIG. 1 depicts an illustrative communication network in accordance with one implementation of the present disclosure.

Aspects and implementations of the present disclosure are directed to comprehensive risk determination and reporting that includes cyber-security and operational aspects. The systems and methods disclosed can be employed with respect to network security, among other fields. More particularly, it can be appreciated that devices with vulnerabilities are a significant and growing problem. At the same time, the proliferation of network-connected devices (e.g., internet of things (IoT) devices such as televisions, security cameras (IP cameras), wearable devices, medical devices, etc.) in both IT and OT (Operational Technology) environments can make it difficult to effectively ensure that network security is maintained. Accordingly, described herein in various implementations are systems, methods, techniques, and related technologies, which allows for determining a risk for each entity based on cyber-security and operational aspects thereby allowing prioritization of risks to reduce.

Alerts (e.g. indicators of problems and ongoing threats) and vulnerabilities may be reported for many devices on a network and the quantity may be too much for a user (e.g., a security analyst) to reasonably prioritize and handle. This quantity is increasing and becoming more and more unmanageable as the number of devices and the related alerts and vulnerabilities increases, making it harder and harder for a user to focus on the most urgent or risky matters. At the same time, determining the current risk posture of an environment and whether something requires immediate attention is at the core of each risk management strategy and is fundamental to prevent cyber-attacks and unexpected downtime.

Several methodologies have been tried to address this problem by automatically translating the information collected by network security tools into accurate risk indicators, but the risk indicators are too limited in scope to assist user in a comprehensive and effective risk mitigation strategy. Three main approaches have been followed by existing methodologies. In one methodology, some vendors have risk indicators computed exclusively based on vulnerability score and the possibility/probability of exploit based on known exploits available in the wild. This, however, does not take into account devices that are already failing or being exploited (e.g., by a known malware or an unknown exploit). These devices should be considered more at risk and require more urgent attention than devices than devices that currently "okay" but have a high possibility of being exploited. In another methodology, risk is determined based on the average severity of the alerts for a certain device, without considering other factors, such as vulnerabilities or importance of the device, resulting in incomplete or incorrect prioritization. In another methodology, some vendors base risk exclusively on how critical a device meaning that the more critical a device is the more it is at risk. This may indicate the potential impact of a problem but not the likelihood that something will happen or that it is currently happening. These methodologies also do not take into account the cost of a certain part of infrastructure with respect to other infrastructure or the disparity in the value of different things. For example, two devices may appear to be the same but have functions that are of different importance in a process and are not the same in terms of cost of downtime.

Embodiment includes determining a comprehensive risk score that allows users to determine the current risk posture of each entity, what to focus on and how urgently to address or prevent the failure of a device or a security threat. The risk score can be visualized and allow a user to easily identify and focus on the assets and threats with the highest risk first. In other words, the single risk score or value allows users to easily determine what to focus on, and how urgently, to prevent a specific problem. This thereby alleviates the problem of a user having to sort through and analyze multiple alerts and vulnerabilities before deciding to take action. The user can focus on the assets at critical risk that need the most immediate attention. A user can further drill down into the details of the risk, understand the nature of the risk, and initiate a rapid and tailored response.

In some embodiments, the risk score of a device may be defined as the likelihood of an event happening multiplied by the impact of the event for each type of risk considered. The types of risk, used in computing the risk score, can include cyber-security or cyber-attack risk and operational failure risk. The cyber-attack likelihood factors can include alerts, vulnerabilities, direct connectivity with a public entity (in other words, exposure to and from the Internet), and proximity to infected/vulnerable entities. The likelihood of operational failure can be based on alerts indicating operational malfunction, misconfiguration, and misuse, among others.

The cyber-attack impact can be based on entity criticality (e.g., how critical an entity is), network criticality (e.g., how an entity is networked with one or more critical entities or whether it is located in a mission-critical area of the network), and proximity to critical devices (e.g. how many "hops" it would require an attacker to move laterally from this device to a critical one). The operational failure impact can be based on entity criticality and network criticality. The resulting risk score is a more powerful metric that allows users to prioritize a response based on the probability of something happening (e.g., vulnerabilities, connectivity to public entities, proximity to infected entities), current evidence of something happening (e.g., alerts), and the impact of the problem or threat.

Table I shows example factors and risk that can be used in determining a risk score, in accordance with various embodiments. In some embodiments, the proximity to critical entities may be optional in determining the operational failure impact. Embodiments may support additional factors beyond those recited herein and may support factors being used in a different order or with fewer factors that described herein.

TABLE I

| | Risks | |
|---|---|---|
| | Cyber-attack | Operational Failure |
| Likelihood | | |
| Alerts | X | X |
| Vulnerabilities | X | |
| Direct connectivity with a public entity (Internet connectivity) | X | |
| Proximity to infected/vulnerable entity | X | |
| Impact | | |
| Entity criticality | X | X |
| Network criticality | X | X |
| Proximity to critical entities | X | X |

The factors used for determining cyber-attack likelihood, operational failure likelihood, cyber-attack impact, and operational failure impact may be customized or selected by a user (e.g., by selecting checkboxes for each of the factors). For example, some cyber-attack alerts may be unselected for determination of cyber-attack likelihood.

In some embodiments, the risk metrics include likelihood resulting in a score between 0-10 and impact results in a multiplier between 0-1. The security or cyber-attack risk value of 1-10 may be based on the result of influencing factors (e.g., vulnerabilities, etc., as shown in Table I). The operational risk or operational failure risk value of 1-10 may be based on result of influencing factors (e.g., entity criticality, etc., as shown in Table I). The total or overall risk score or value may be the highest value between security risk and operational risk.

In some embodiments, alerts may be scored according to the below Table II. In various embodiments, alerts may be considered if the alerts are not "closed" or have a possibility of being false positives. The alerts used for risk analysis may be selected based on a specified time period (e.g., the time period may be selected via a dropdown with predefined intervals, the time period may be customizable, etc.).

TABLE II

| Alerts | | | |
|---|---|---|---|
| Alerts | Score | Threshold(t) | Calculation: min(max_score, min_score + ((number_of_alerts * (max_score − min_score))/t)) |
| No Alerts | 0 | | |
| Max alert = low | 0.1-3.9 | 100 low alerts = 3.9 | min(3.9, 0.1 + ((number_of_low_alerts * (3.9 − 0.1))/t)) |
| Max alert = medium | 4.0-6.9 | 100 medium alerts = 6.9 | min(6.9, 4.0 + ((number_of_medium_alerts * (6.9 − 4.0))/t)) |
| Max alert = high | 7.0-8.9 | 100 high alerts = 8.9 | min(8.9, 7.0 + ((number_of_high_alerts * (8.9 − 7.0))/t)) |
| Max alert = critical | 9.0-10.0 | 100 critical alerts = 10 | min(10.0, 9.0 + ((number_of_critical_alerts * (10.0 − 9.0))/t)) |

In some embodiments, vulnerabilities may be scored based on considering the highest vulnerability score of an entity, since it reflects the highest risk of that entity being exploited according to the below Table III. The vulnerability score may be based on the common vulnerabilities scoring system (CVSS). In various embodiments, the filtering may be applied to the vulnerabilities to select vulnerabilities that have a high matching confidence.

TABLE III

| Vulnerabilities | | |
|---|---|---|
| Vulnerabilities | Score | Calculation |
| No Vulnerabilities | 0 | |
| Max vulnerability = low CVSS rating | 0.1-3.9 | max vulnerability score |
| Max vulnerability = medium CVSS rating | 4-6.9 | max vulnerability score |
| Max vulnerability = high CVSS rating | 7.0-8.9 | max vulnerability score |
| Max vulnerability = critical CVSS rating | 9-10 | max vulnerability score |

In some embodiments, the number or quantity of vulnerabilities may be taken into account as indicated in Table IV. For example, the equation for taking into account the number of quantity of vulnerabilities may be: min (max_CVSS_rating, min_CVSS_rating+((number_of_vulnerabilities*(max_CVSS_rating−min_CVSS_rating))/t)).

TABLE IV

Vulnerabilities

| Vulnerabilities | Score | Threshold(t) | Calculation: min(max_CVSS_rating, min_CVSS_rating + ((number_of_vulnerabilities * (max_CVSS_rating − min_CVSS_rating))/t)) |
|---|---|---|---|
| No Vulnerabilities | 0 | | |
| Max vulnerability = low CVSS rating | 0.1-3.9 | 100 low vulnerabilities = 3.9 | min(3.9, 0.1 + ((number_of_low_vulnerabilities * (3.9 − 0.1))/t)) |
| Max vulnerability = medium CVSS rating | 4-6.9 | 100 medium vulnerabilities = 6.9 | min(6.9, 4.0 + ((number_of_medium_vulnerabilities * (6.9 − 4.0))/t)) |
| Max vulnerability = high CVSS rating | 7.0-8.9 | 100 high vulnerabilities = 8.9 | min(8.9, 7.0 + ((number_of_high_vulnerabilities * (8.9 − 7.0))/t)) |
| Max vulnerability = critical CVSS rating | 9-10 | 100 critical vulnerabilities = 10 | min(10.0, 9.0 + ((number_of_critical_vulnerabilities * (10.0 − 9.0))/t)) |

In some embodiments, direct connectivity to public entities may be scored according to the below Table V. In various embodiments, the direct connectivity to public entities considered may be based on if a communication with a public entity occurred within a recent specific time period or filtered for a specific time period (e.g., the time period may be selected via a dropdown with predefined intervals, the time period may be customizable, etc.).

TABLE V

Direct Connectivity To Public Entities

| Direct Connectivity To Public Entities | Score | Threshold(t) | Calculation |
|---|---|---|---|
| Connectivity | 0-10 | None | yes = 10; no = 0 |

In some embodiments, the proximity to infected entities may be scored according to the below Table VI. In various embodiments, the medium risk may be reported based on computational resources being available to make the determination of medium risk (e.g., based on examining each 2-hop link from the current entity to each other entity within that range).

The alerts considered for the proximity to infected entities score may be limited to being within a recent specified time period (e.g., the time period may be selected via a dropdown with predefined intervals, the time period may be customizable, etc.). In some embodiments, other events or alerts may be considered (e.g., blacklisted domains or IP addresses).

In various embodiments, vulnerabilities may be considered in addition to the alerts for determining the proximity to infected entities score. For example, whether an entity that is 1 or 2 hop link from the current entity is vulnerable. In some embodiments, information from network infrastructure devices (e.g. switches, firewalls) may be considered in place of 1-hop and 2-hop links for determining whether two entities may communicate and calculate the infected entities score accordingly.

TABLE VI

Proximity to infected entities

| Proximity to infected entities | Score | Threshold(t) | Calculation |
|---|---|---|---|
| Low risk | 0 | None | |
| Medium risk | 5 | None | if there exists a 2-hop link from the current host A to another host B that has at least one alert indicating a malware infection then the score is equal to 5 (e.g. A <-> C <-> B and B is infected) or if based on the information collected from network infrastructure devices, hosts A and B may communicate through a host C, and B has a least one alert indicating a malware infection, then the score is equal to 5 |
| High risk | 10 | None | if there exists a 1-hop link from the current host A to another host B that has at least one alert indicating a malware infection then the score is equal to 10 (e.g. A <-> B and B is infected) or if based on the information collected from network infrastructure devices, hosts A and B may communicate and B has a least one alert indicating a malware infection, then the score is equal to 10 |

In some embodiments, entity criticality may be scored according to the below Table VII.

TABLE VII

Entity Criticality

| Entity Criticality | Score | Threshold(t) | Calculation |
|---|---|---|---|
| Entity Criticality | 0-1 | None | 0.5 + current entity criticality divided by 10 (entity criticalities go from 1 to 5, where 1 indicates low criticality entities and 5 mission-critical entities) |

In some embodiments, network criticality may be scored according to the below Table VIII.

TABLE VIII

Network Criticality

| Network Criticality | Score | Threshold(t) | Calculation |
|---|---|---|---|
| Network Criticality | 0-1 | None | 0.5 + max criticality of the entities in the same monitored network as the current entity (e.g., including the entity itself) divided by 10 |

In some embodiments, the proximity to critical entities may be scored according to the below Table IX. This factor determines whether critical entities rely on a current entity for their correct functioning (e.g., one or more critical entities are dependent on the current entity for proper functioning, for instance, a safety PLC may be dependent upon field sensors and actuators to detect and respond to environmental changes).

TABLE IX

Proximity to critical entities

| Proximity to critical entities | Score | Threshold(t) | Calculation |
|---|---|---|---|
| Low risk | 0 | None | No proximity (e.g., no link) to critical entities from a current entity |
| High risk | 1 | None | if there exists a link from the current entity to an entity with entity criticality high or critical |

The risk score can be further defined by applying a customizable weight for each factor. Table X shows example customizable weights for each factor and risk that can be used in determining a risk score, in accordance with various embodiments. In some embodiments, one or more weights may be chosen to normalize scores within a range (e.g., 0-1).

TABLE X

| | Risks | |
|---|---|---|
| | Cyber-attack | Operational Failure |
| Likelihood | | |
| Alerts | Score * 0.7 | Score |
| Vulnerabilities | Score * 0.1 | |
| Direct connectivity with a public entity | Score * 0.1 | |
| Proximity to infected/vulnerable entity | Score * 0.1 | |
| Impact | | |
| Entity criticality | Score * 0.7 | Score * 0.8 |
| Network criticality | Score * 0.1 | Score * 0.1 |
| Proximity to critical entities | Score * 0.2 | Score * 0.1 |

Using the weights, the security or cyber-attack risk and operational or operational failure risk can then be computed using the equations:

Cyber-attack risk=sum of cyber-attack likelihood scores*sum of cyber-attack impact scores Operational failure risk=sum of operational failure likelihood scores*sum of operational failure impact scores In some embodiments, the asset or entity risk may then be computed as the maximum of the cyber-attack risk and operational failure risk. This can be expressed as the equation: Entity risk=Maximum(Cyber-attack risk, Operational failure risk) Where: Cyber-attack risk=sum of cyber-attack likelihood scores*sum of cyber-attack impact scores Operational failure risk=sum of operational failure likelihood score*sum of operational failure impact scores In some embodiments, the entity risk may be displayed and upon selection, the details of the risk score, e.g., including whether the score is due to cyber-attack risk or operational failure risk and the individual scores for each factor (e.g., cyber-attack alerts, operational failure entity criticality) to aid in determining the best response and prioritization.

In various embodiments, the risk score may be provided on an entity or asset level basis or on an abstracted basis including the network or location level or enterprise level. The location level can include the part of the network, subnet of a network, segment, geographic region, plant, department, production line, etc.

In some embodiments, a recommended remediation may be provided which may include patching, creating a ticket, a firmware update, segmentation, replacement of a device, e.g., if the device is about to fail, changing cables, e.g., if connectivity is a problem, etc., as described herein.

Embodiments may further incorporate monetary or financial risk into the risk score. The monetary or financial risk may reflect the cost of downtime of a plant, a portion of a plant, or other part of a business. The use of the monetary or financial risk enables the financial perspective to be considered and the potential cost of the risk to materialize. The monetary or financial risk for an asset or entity may then be computed as the maximum of the cyber-attack risk and operational failure risk. This can be expressed as the equation:

Entity monetary risk=Maximum(Cyber-attack risk, Operational failure risk)

Where:

Cyber-attack risk=sum of cyber-attack likelihood scores*monetary impact

Operational failure risk=sum of operational failure likelihood scores*monetary impact The monetary impact may be based on a dollar value (e.g., input by a user) for any level of a business. For example, revenue for a particular location or part of a location (e.g., one or more production lines) may be used. The average cost of unplanned downtime for manufacturing facilities is estimated to be approximately $260,000 per hour. For example, the monetary impact may be based on the amount of revenue a manufacturing plant makes or amount of revenue a manufacturing plant makes for a single production line. In the case of the amount of revenue for a production line, that monetary impact may apply to those entities or devices that are part of the production line. The incorporation by embodiments of monetary information allows comparisons between two different portions of a business (e.g., plants, production lines) to allow remediation of risk where more revenue or other financial metrics are at stake. Embodiments may support additional monetary or financial related factors.

Accordingly, the user of a comprehensive risk value is enabled to more effectively manage risk as the user is empowered to focus on the assets or entities with most actual risk. The comprehensive risk value further allows the users to focus on the most important assets, most important area(s)

of the network, etc., with the appropriate urgency to prevent one or more specific problems. The incorporation of operational failure advantageously makes managing operational technology (OT) and information technology (IT) networks significantly more efficient.

Operational Technology (OT) can include devices from a wide variety of industries, including, but not limited to, medical systems, electrical systems (e.g., power generation, power distribution, and other power utility devices and infrastructure), oil and gas plants, mining facilities, manufacturing systems, water distribution systems, chemical industry systems, pharmaceutical systems, infrastructure systems (e.g., used with roads, railways, tunnels, bridges, dams and buildings), and other industrial control systems.

Embodiments provide more accurate risk reporting that enables a user to take the most effective action on the most at risk assets as they address risks throughout the network in a prioritized manner. The risk reporting may also be used to make investment decisions including selecting tools or other products (e.g., monitoring products, segmentation products, training, etc.) to reduce to or prevent risk. Embodiments enable both global analysis and drilling down via a graphical user interface. Embodiments will significantly reduce the information overload that users are currently suffering from, and support non-experts users by driving their focus.

The results of accurate risk values can thus have a significant impact in preventing events including stopping output production (e.g., of a factory or fuel system), stopping critical components, reducing or limiting the effectiveness of safety systems, result in significant injury or death to a person or animal, and cost significant amount of money due to downtime. For example, if a safety PLC becomes inoperative thereby preventing an alarm from activating or preventing an elevator from stopping at the right location or operating at a safe speed, there can be significant danger to the workers of a site or building. Embodiments can be used be in a variety of environments including, but not limited to, campus, data center, cloud, medical, and operational technology or industrial environments.

Advantageously, embodiments are configured for determining a more sophisticated risk score that incorporates cyber-attack risk and operational failure risk and is reflected in a single value that can be visualized to allow prioritization. That is, embodiments enable better use of compliance and security resources within an organization. Resources are thus made available by embodiments to focus on responding to security threats and reducing risk in an efficient and effective manner.

Accordingly, described herein in various implementations are systems, methods, techniques, and related technologies, which may perform comprehensive risk analysis. As described herein, various combinations of cyber-security risk, operational risk, and monetary risk, among others, can be used for comprehensive risk determination thereby allowing effective response prioritization.

It can be appreciated that the described technologies are directed to and address specific technical challenges and longstanding deficiencies in multiple technical areas, including but not limited to network security, monitoring, and policy enforcement. It can be further appreciated that the described technologies provide specific, technical solutions to the referenced technical challenges and unmet needs in the referenced technical fields.

An entity or entities, as discussed herein, includes devices (e.g., computer systems, for instance laptops, desktops, servers, mobile devices, IoT devices, OT devices, etc.), network devices or infrastructure (e.g., firewall, switch, access point, router, enforcement point, etc.), endpoints, virtual machines, services, serverless services (e.g., cloud based services), containers (e.g., user-space instances that work with an operating system featuring a kernel that allows the existence of multiple isolated user-space instances), cloud based storage, accounts, and users. Depending on the entity, an entity may have an IP address (e.g., a device) or may be without an IP address (e.g., a serverless service).

Enforcement points including firewalls, routers, switches, cloud infrastructure, other network devices, etc., may be used to enforce segmentation on a network (and different address subnets may be used for each segment). Enforcement points may enforce segmentation by filtering or dropping packets according to the network segmentation policies/rules.

The enforcement points may be one or more network devices (e.g., firewalls, routers, switches, virtual switch, hypervisor, SDN controller, virtual firewall, etc.) that are able to enforce access or other rules, ACLs, or the like to control (e.g., allow or deny) communication and network traffic (e.g., including dropping packets) between the entity and one or more other entities communicatively coupled to a network. Access rules may control whether an entity can communicate with other entities in a variety of ways including, but not limited to, blocking communications (e.g., dropping packets sent to one or more particular entities), allowing communication between particular entities (e.g., a desktop and a printer), allowing communication on particular ports, etc. It is appreciated that an enforcement point may be any device that is capable of filtering, controlling, restricting, or the like communication or access on a network.

FIG. 1 depicts an illustrative communication network 100, in accordance with one implementation of the present disclosure. The communication network 100 includes a network monitor device 102, a network device 104, an aggregation device 106, a system 150, devices 120 and 130, and network coupled devices 122a-b. The devices 120 and 130 and network coupled devices 122a-b may be any of a variety of devices or entities including, but not limited to, computing systems, laptops, smartphones, servers, Internet of Things (IoT) or smart devices, supervisory control and data acquisition (SCADA) devices, operational technology (OT) devices, campus devices, data center devices, edge devices, etc. It is noted that the devices of communication network 100 may communicate in a variety of ways including wired and wireless connections and may use one or more of a variety of protocols.

Network device 104 may be one or more network devices configured to facilitate communication among aggregation device 106, system 150, network monitor device 102, devices 120 and 130, and network coupled devices 122a-b. Network device 104 may be one or more network switches, access points, routers, firewalls, hubs, etc.

Network monitor device 102 may be operable for a variety of tasks including determining a comprehensive risk score for each entity communicatively coupled to a network, as described herein. The comprehensive risk score or value may incorporate the cyber-attack likelihood, cyber-attack impact, operational failure likelihood, and operational failure impact, as described herein.

Network monitor device 102 may provide an interface (e.g., a graphical user interface (GUI)) for viewing, monitoring, modifying, and configuring risk determination. In some embodiments, network monitor device 102 is operable to perform visualization (e.g., including tables or matrixes)

of risk values for each entity and groups of entities (e.g., a segment, a location, a production line, etc.).

Network monitor device 102 may further perform a variety of operations including identification, classification, and taking one or more remediation actions (e.g., changing network access of an entity, changing the virtual local area network (VLAN), sending an email, sending a short message service (SMS) message, etc.).

Network monitor device 102 may be a computing system, network device (e.g., router, firewall, an access point), network access control (NAC) device, intrusion prevention system (IPS), intrusion detection system (IDS), deception device, cloud-based device, virtual machine based system, etc. Network monitor device 102 may be an enforcement point including, but not limited to, a router, firewall, switch, hypervisor, software-defined networking (SDN) controller, virtual firewall, a next generation firewall (NGFW), cloud infrastructure, or other network device or infrastructure device.

Network monitor device 102 may be communicatively coupled to the network device 104 in such a way as to receive network traffic flowing through the network device 104 (e.g., port mirroring, sniffing, acting as a proxy, passive monitoring, etc.). In some embodiments, network monitor device 102 may include one or more of the aforementioned devices. In various embodiments, network monitor device 102 may further support high availability and disaster recovery (e.g., via one or more redundant devices).

In some embodiments, network monitor device 102 may monitor a variety of protocols (e.g., Samba, hypertext transfer protocol (HTTP), secure shell (SSII), file transfer protocol (FTP), transfer control protocol/internet protocol (TCP/IP), user datagram protocol (UDP), Telnet, HTTP over secure sockets layer/transport layer security (SSL/TLS), server message block (SMB), point-to-point protocol (PPP), remote desktop protocol (RDP), windows management instrumentation (WMI), windows remote management (WinRM), proprietary protocols, etc.).

The monitoring of entities by network monitor device 102 may be based on a combination of one or more pieces of information including traffic analysis, information from external or remote systems (e.g., system 150), communication (e.g., querying) with an aggregation device (e.g., aggregation device 106), and querying the entity itself (e.g., via an API, CLI, web interface, SNMP, etc.), which are described further herein. Network monitor device 102 may be operable to use one or more APIs to communicate with aggregation device 106, device 120, device 130, or system 150. Network monitor device 102 may monitor for or scan for entities that are communicatively coupled to a network via a NAT device (e.g., firewall, router, etc.) dynamically, periodically, or a combination thereof.

Information from one or more external or $3^{rd}$ party systems (e.g., system 150) may further be used for determining one or more tags or characteristics for an entity. For example, a vulnerability assessment (VA) system may be queried to verify or check if an entity is in compliance and provide that information to network monitor device 102. External or $3^{rd}$ party systems may also be used to perform a scan or a check on an entity to determine a software version.

Device 130 can include agent 140. The agent 140 may be a hardware component, software component, or some combination thereof configured to gather information associated with device 130 and send that information to network monitor device 102. The information can include the operating system, version, patch level, firmware version, serial number, vendor (e.g., manufacturer), model, asset tag, software executing on an entity (e.g., anti-virus software, malware detection software, office applications, web browser(s), communication applications, etc.), services that are active or configured on the entity, ports that are open or that the entity is configured to communicate with (e.g., associated with services running on the entity), media access control (MAC) address, processor utilization, unique identifiers, computer name, account access activity, etc. The agent 140 may be configured to provide different levels and pieces of information based on device 130 and the information available to agent 140 from device 130. Agent 140 may be able to store logs of information associated with device 130. Network monitor device 102 may utilize agent information from the agent 140. While network monitor device 102 may be able to receive information from agent 140, installation or execution of agent 140 on many entities may not be possible, e.g., IoT or smart devices.

System 150 may be one or more external, remote, or third party systems (e.g., separate) from network monitor device 102 and may have information about devices 120 and 130 and network coupled devices 122a-b. System 150 may include a vulnerability assessment (VA) system, a threat detection (TD) system, endpoint management system, a mobile device management (MDM) system, a firewall (FW) system, a switch system, an access point system, etc. Network monitor device 102 may be configured to communicate with system 150 to obtain information about devices 120 and 130 and network coupled devices 122a-b on a periodic basis, as described herein. For example, system 150 may be a vulnerability assessment system configured to determine if device 120 has a computer virus or other indicator of compromise (IOC).

The vulnerability assessment (VA) system may be configured to identify, quantify, and prioritize (e.g., rank) the vulnerabilities of an entity. The VA system may be able to catalog assets and capabilities or resources of an entity, assign a quantifiable value (or at least rank order) and importance to the resources, and identify the vulnerabilities or potential threats of each resource. The VA system may provide the aforementioned information for use by network monitor device 102.

The advanced threat detection (ATD) or threat detection (TD) system may be configured to examine communications that other security controls have allowed to pass. The ATD system may provide information about an entity including, but not limited to, source reputation, executable analysis, and threat-level protocols analysis. The ATD system may thus report if a suspicious file has been downloaded to a device being monitored by network monitor device 102.

Endpoint management systems can include anti-virus systems (e.g., servers, cloud based systems, etc.), next-generation antivirus (NGAV) systems, endpoint detection and response (EDR) software or systems (e.g., software that record endpoint-system-level behaviors and events), compliance monitoring software (e.g., checking frequently for compliance).

The mobile device management (MDM) system may be configured for administration of mobile devices, e.g., smartphones, tablet computers, laptops, and desktop computers. The MDM system may provide information about mobile devices managed by MDM system including operating system, applications (e.g., running, present, or both), data, and configuration settings of the mobile devices and activity monitoring. The MDM system may be used get detailed mobile device information which can then be used for device monitoring (e.g., including device communications) by network monitor device 102.

The firewall (FW) system may be configured to monitor and control incoming and outgoing network traffic (e.g., based on security rules). The FW system may provide information about an entity being monitored including attempts to violate security rules (e.g., unpermitted account access across segments) and network traffic of the entity being monitored.

The switch or access point (AP) system may be any of a variety of network devices (e.g., network device 104 or aggregation device 106) including a network switch or an access point, e.g., a wireless access point, or combination thereof that is configured to provide an entity access to a network. For example, the switch or AP system may provide MAC address information, address resolution protocol (ARP) table information, device naming information, traffic data, etc., to network monitor device 102 which may be used to monitor entities and control network access of one or more entities. The switch or AP system may have one or more interfaces for communicating with IoT or smart devices or other devices (e.g., ZigBee™, Bluetooth™, etc.), as described herein. The VA system, ATD system, and FW system may thus be accessed to get vulnerabilities, threats, and user information of an entity being monitored in realtime which can then be used to determine a risk level of the entity.

Aggregation device 106 may be configured to communicate with network coupled devices 122a-b and provide network access to network coupled devices 122a-b. Aggregation device 106 may further be configured to provide information (e.g., operating system, entity software information, entity software versions, entity names, application present, running, or both, vulnerabilities, patch level, etc.) to network monitor device 102 about the network coupled devices 122a-b. Aggregation device 106 may be a wireless access point that is configured to communicate with a wide variety of devices through multiple technology standards or protocols including, but not limited to, Bluetooth™, Wi-Fi™, ZigBee™, Radio-frequency identification (RFID), Light Fidelity (Li-Fi), Z-Wave, Thread, Long Term Evolution (LTE), Wi-Fi™ HaLow, HomePlug, Multimedia over Coax Alliance (MoCA), and Ethernet. For example, aggregation device 106 may be coupled to the network device 104 via an Ethernet connection and coupled to network coupled devices 122a-b via a wireless connection. Aggregation device 106 may be configured to communicate with network coupled devices 122a-b using a standard protocol with proprietary extensions or modifications.

Aggregation device 106 may further provide log information of activity and properties of network coupled devices 122a-b to network monitor device 102. It is appreciated that log information may be particularly reliable for stable network environments (e.g., where the types of devices on the network do not change often). The log information may include information of updates of software of network coupled devices 122a-b.

Figure 2:
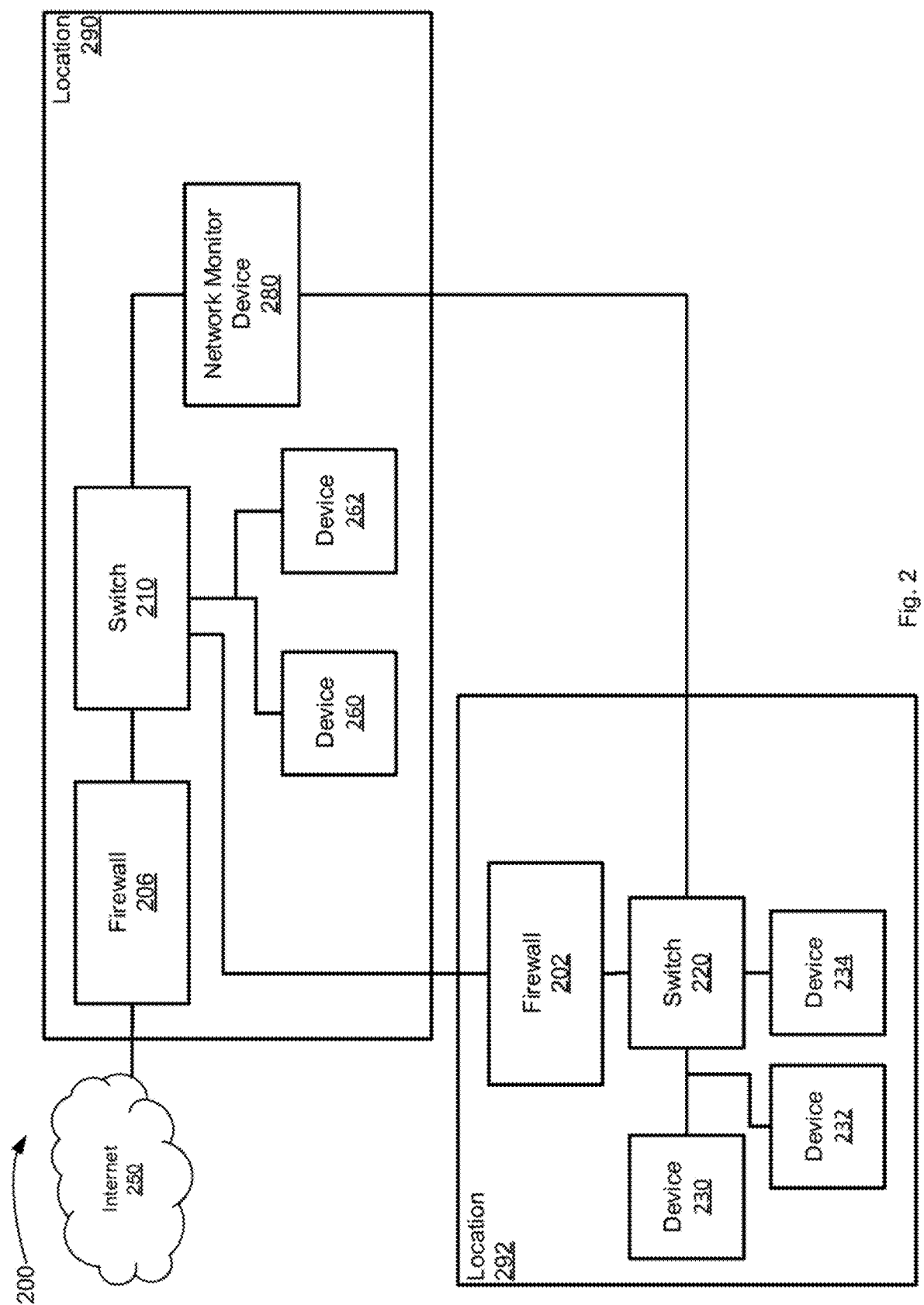
FIG. 2 depicts an illustrative network topology in accordance with one implementation of the present disclosure.

FIG. 2 depicts an illustrative network topology in accordance with one implementation of the present disclosure. FIG. 2 depicts an example network 200 with multiple enforcement points (e.g., firewalls 202-206 and switches 210-220) and a network monitor device 280 (e.g., network monitor device 102) which may handle gathering information about the various devices communicatively coupled to example network 200. Network monitor device 280 can perform comprehensive risk analysis of entities (e.g., devices 230-234 and 260-262) and combine risk scores (e.g., for one or more locations), as described herein, for example network 200. The information gathered by network monitor device 280 can be used for prioritizing risks for mitigation, etc., as described herein.

FIG. 2 shows example devices 230-262 (e.g., devices 106, 122a-b, 120, and 130, other physical or virtual devices, other entities, etc.) and it is appreciated that more or fewer network devices or other entities may be used in place of the devices of FIG. 2. Example devices 230-262 may be any of a variety of devices or entities (e.g., OT devices, IoT devices, IT devices, etc.), as described herein. For example, the enforcement points including firewalls 202-206 and switches 210-220 may be any entity (e.g., network device 104, cloud infrastructure, etc.) that is operable to allow traffic to pass, drop packets, restrict traffic, etc. Network monitor device 280 may be any of a variety of network devices, e.g., router, firewall, an access point, network access control (NAC) device, intrusion prevention system (IPS), intrusion detection system (IDS), deception device, cloud-based device, virtual machine based system, etc. Network monitor device 280 may be substantially similar to network monitor device 102. Embodiments support IPv4, IPv6, and other addressing schemes. In some embodiments, network monitor device 280 may be communicatively coupled with firewalls 202-206 and switches 210-220 through additional individual connections (e.g., to receive or monitor network traffic through firewalls 202-206 and switches 210-220).

Switches 210-220 communicatively couple the various devices of network 200 including firewalls 202-206, network monitor device 280, and devices 230-262. Firewalls 202-206 may perform network address translation (NAT) and firewall 202 may communicatively couple the devices 230-234, which are behind the firewall 202, with network monitor device 280, switch 210, and firewall 206. Firewall 206 communicatively couples network 200 to Internet 250 and firewall 206 may restrict or allow access to Internet 250 based on particular rules or ACLs configured on firewall 206. Firewalls 202-206 and switches 210-220 are enforcement points, as described herein.

Network monitor device 280 is configured to identify, classify, determine one or more characteristics of entities (e.g., devices 230-262), determine a risk value or score for each entity, or a combination thereof on network 200, as described herein. Network monitor device 280 can access network traffic from network 200 (e.g., via port mirroring or switched port analyzer (SPAN) ports of firewalls 202-206 and switches 210-220). Network monitor device 280 can perform passive scanning of network traffic by observing and accessing portions of packets from the network traffic of network 200. Network monitor device 280 may perform an active scan of a device of network 200 by sending a request to any entity of network 200. The information from passive and active scans of entities of network 200 can be used to determine a risk for each entity of network 200, as described herein.

As shown, network 200 is spread over locations 290-292. Locations 290-292 may be separate geographical locations, separate plants, different parts of a single plant, different segments, subnetworks, etc. Embodiments may determine a respective risk value for each of locations 290-292 (e.g., based on averaging the risk of entities at a location, based on a monetary value associated with a location, other factors, or any combination thereof), as described herein. Embodiments may further support determining a risk value for groups of entities (e.g., department, division, floor, building, etc.).

For example, device 260 may be a Windows™ workstation and device 234 may be a PLC. The Windows™ workstation 260 is used for back-office data analysis and forecasting. The PLC 234 controls a manufacturing process. The Windows™ workstation 260 is suspected of being subject to an intrusion attempt. There have been numerous observed port scan attempts in the last few days and a few malformed packets have been sent to the workstation, e.g., possibly to attempt an exploit. Several vulnerabilities are known for the workstation, with criticality ranging from low to critical (e.g., an adjusted common vulnerabilities scoring system (CVSS) score of 9.6). The workstation has Internet connectivity (e.g., via firewalls 206 and switch 210) but there is no other known infection or compromise in the network.

The PLC 234 has recently shown some signs of malfunction, with unexpected restarts occurring a few times a week. The network is well segmented, and the PLC 234 has absolutely no Internet connectivity nor is there any known infection in its subnetwork. The highest known vulnerability for the PLC has high criticality (e.g., adjusted CVSS score of 7.5).

The resulting risk factor scores for the above scenario are depicted in the table below. Weights are depicted in brackets. Table XI shows example factor scores and weights (in [ ]) for each factor that can be used in determining a respective risk score for the Windows™ workstation 260 and the PLC 234, in accordance with various embodiments. The weights are configured so that the impact scores are normalized on a scale of 0-1.

TABLE XI

| | | Windows™ workstation 260 | | PLC 234 | |
|---|---|---|---|---|---|
| | | Security risk | Operational risk | Security risk | Operational risk |
| Likelihood | Alerts | 8.5 (repeated high severity alerts) [0.7] | 0 | 0 [0.7] | 8.6 (repeated high severity alerts) |
| | Vulnerabilities | 9.6 [0.1] | | 7.5 [0.1] | |
| | Internet connectivity | 10 [0.1] | | 0 [0.1] | |
| | Proximity to infected entities | 0 [0.1] | | 0 [0.1] | |
| Impact | Entity criticality | 0.7 (Low) [0.7] | 0.7 (Low) [0.8] | 0.9 (High) [0.7] | 0.9 (High) [0.8] |
| | Network criticality | 0.7 (Low) [0.1] | 0.7 (Low) [0.2] | 0.9 (High) [0.1] | 0.9 (High) [0.2] |
| | Proximity to critical networks | 0 (No link) [0.2] | | 1 (Yes) [0.2] | |

It is noted, that switch 220 may have high network criticality since it communicatively couples the PLC 234, which controls a manufacturing process, to the rest of network 200.

Assuming the weights in the Table XI (above), these two devices would have the following current risk scores:

Windows workstation 260:

Security risk=(8.5*0.7+9.6*0.1+10*0.1+0*0.1)* (0.7*0.7+0.7*0.1+0*0.2)=4.4

Operational risk=0*(0.7*0.8+0.7*0.2)=0

Total risk of downtime from Windows™ workstation 260=4.4 (max(4.4, 0))

PLC 234:

Security risk=(0*0.7+7.5*0.1+0*0.1+0*0.1)* (0.9*0.7+0.9*0.1+1*0.2)=0.7

Operational risk=8.6*(0.9*0.8+0.9*0.2)=7.74

Total risk of downtime from PLC 234=7.74 (max(0.7, 7.74))

Thus, the risk scores of PLC 234 and Windows™ workstation 260 reflect that PLC 234 in its current risk posture requires more immediate attention, as its state may impact the business (e.g., including a monetary impact), as manufacturing of the company may be shutdown or might have safety implications if PLC 234 controls safety aspects of the manufacturing process (e.g., as indicated by the high device criticality).

Figure 3:
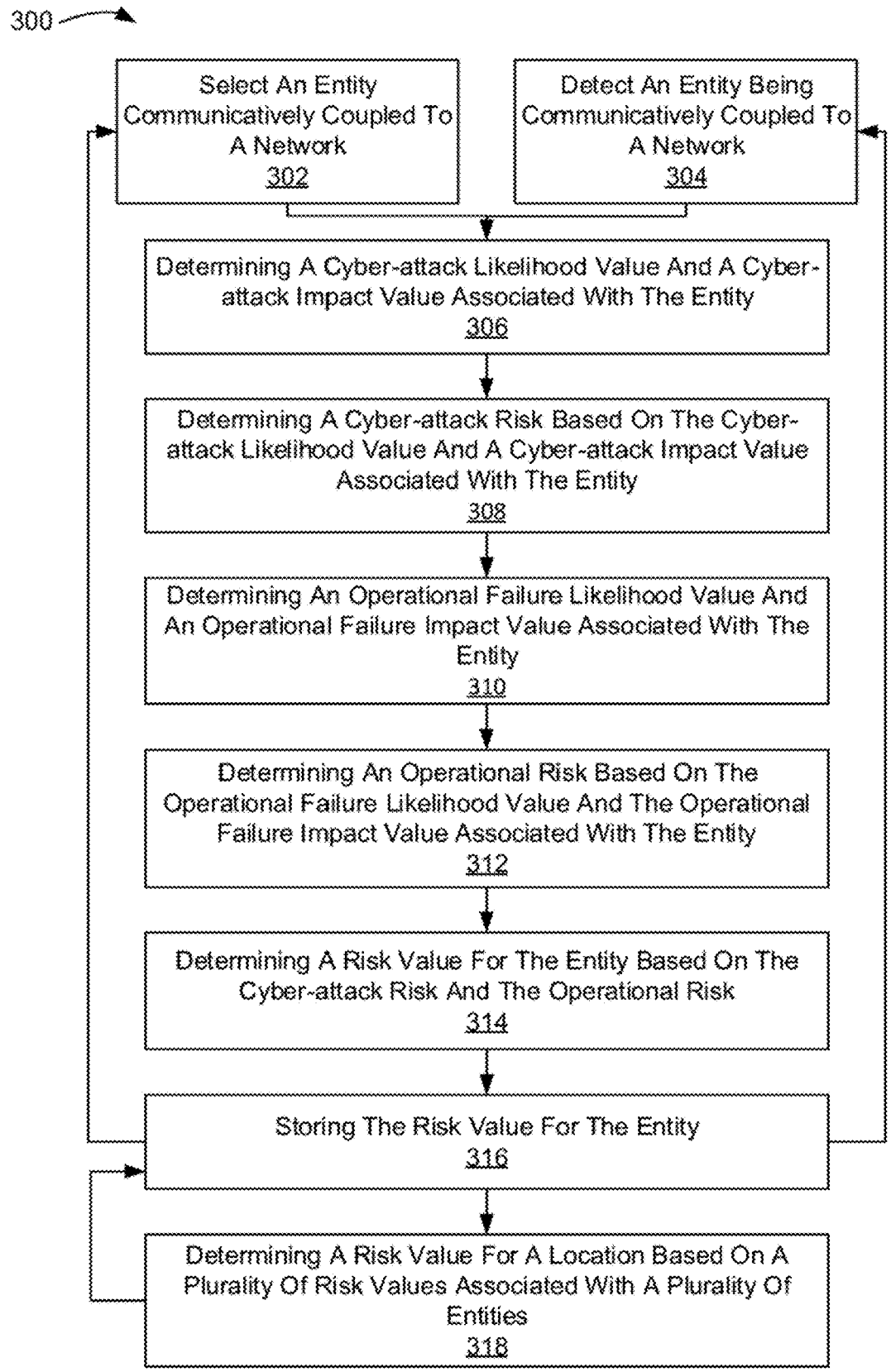
FIG. 3 depicts a flow diagram of aspects of a method for determining a risk score in accordance with one implementation of the present disclosure.

With reference to FIG. 3, flowchart 300 illustrates example operations used by various embodiments. Although specific operation blocks ("blocks") are disclosed in flowchart 300, such blocks are examples. That is, embodiments are well suited to performing various other blocks or variations of the blocks recited in flowchart 300. It is appreciated that the blocks in flowchart 300 may be performed in an order different than presented, and that not all of the blocks in flowchart 300 may be performed.

FIG. 3 depicts a flow diagram of aspects of a method for determining a risk score in accordance with one implementation of the present disclosure. Various portions of flowchart 300 may be performed by different components (e.g., components of system 400) of an entity (e.g., network monitor device 102 or network monitor device 280). Flowchart 300 depicts a process for determining a comprehensive risk score or value based on cyber-attack likelihood, cyber-attack impact, operational failure likelihood, and operational failure impact, as described herein.

At block 302, an entity communicatively coupled to a network is selected. The entity may be selected as part of a periodic scan of the network (e.g., a scan of network 100 by network monitoring device 102). The entity may further be selected as part of a continuous, real-time, or combination thereof scan of the network. The entity may be a device, a user, etc., as described herein.

At block 304, an entity being communicatively coupled to the network is detected. The entity may be detected upon being communicatively coupled to the network (e.g., being communicatively coupled to network device 104 or other enforcement point). The detecting of the entity coupled to the network may include detecting the entity in response to the entity being recoupled or readmitted to the network. This may further include detecting that a user has logged into a machine or the active user account on a device has changed.

The entity that has been detected may be selected for determining a risk score therewith.

At block 306, a cyber-attack likelihood value and a cyber-attack impact value associated with the entity are determined. The cyber-attack likelihood value can be based on one or more alerts, one or more vulnerabilities, direct connectivity with a public entity or host, proximity to compromised (e.g., infected) or vulnerable entities, or a combination thereof.

The alerts that may be used for determining a cyber-attack likelihood can be from multiple categories including, but not limited to, exposures, reconnaissance, exploitation, internal activity/lateral movement, command and control (e.g., related to malware, a botnet, etc.), and execution. Custom events or alerts may also be supported. The exposures category of alerts may include alerts for communications made or other activity associated with a vulnerability, use of insecure protocols, and login attempts or successes using blacklisted credentials, which can be used to determine a risk for a destination of a communication associated with the alert. The exposures category can further include an alert for use of a blacklisted SSL certificate or SSL certificate issuer not whitelisted, which may be used to determine a risk for the source of the communication associated with the alert.

The reconnaissance category of alerts may include alerts for directory traversal, brute force login attempts, internet control message protocol (ICMP) host discovery attempts, and port scans, which may be used to determine a risk for a destination of a communication associated with the alert.

The exploitation category of alerts may include alerts for malformed protocol messages (e.g., lengths or values), and exploitation attempts of vulnerabilities (e.g., CVE), which may be used to determine a risk for a destination of a communication associated with the alert.

The internal activity/lateral movement category of alerts may include alerts for indications of a possible man-in-the-middle (MITM) attack, communication from/to a port not whitelisted, source host not whitelisted, message type not whitelisted, application protocol not whitelisted, non-compliant distributed network protocol (DNP3) message, unusual fields or data types in the fields of a protocol message, field values outside of a whitelisted range, which may be used to determine a risk for a destination of a communication associated with the alert.

The internal activity/lateral movement category of alerts may further include alerts for blacklisted communication, source and destination hosts not whitelisted, communication pattern not whitelisted, destination host not whitelisted, blacklisted file operation, blacklisted SSL client application, SSL client application not whitelisted, and worm or malware communication or communication attempt, which may be used to determine a risk for a source and a destination of a communication associated with the alert.

The command and control category of alerts may include alerts for communication with a blacklisted IP address, which can be used to determine a risk for an entity with an IP that is not blacklisted. The command and control category of alerts may further include alerts for a DNS request for a blacklisted domain, or a DNS request for domain that is not whitelisted, which may be used to determine a risk for a source of a communication associated with the alert.

The execution category of alerts may include alerts for denial of service attacks, floods, buffer overflow attempts, service crash attempts, attempts to exploit an FTP server, communication between public and private networks (attempted or actual), which may be used to determine a risk for a destination of a communication associated with the alert.

The execution category of alerts may include alerts for a DNS tunneling attempt, which may be used to determine a risk for a source of a communication associated with the alert. The execution category of alerts may further include alerts for attempted communication between public and private networks and communication between public and private networks was attempted, which may be used to determine a risk for an entity with a private IP address.

The one or more vulnerabilities can include CVE, use of insecure protocols or services, anything that shows a possible weakness or entry point to an entity.

The direct connectivity with a public entity or host can include unrestricted (e.g., not restricted by network infrastructure, for instance, a segmentation scheme, or firewall) to the Internet or connectivity with an entity that has access to the Internet. Public host is an entity on the Internet or an Internet connected entity.

The proximity to compromised (e.g., infected) or vulnerable entities can be based on how close and the quantity of compromised entities are to a particular entity. This can include how many entities near a device on a network are infected or vulnerable and how close the infected entities are in terms of network hops, links, or other metric. For example, if a device is connected to the same switch as a device that is infected with malware, the device may have a proximity to compromised (e.g., infected) or vulnerable entities score of 10. The score is a manifestation of the closeness and likelihood of the infection spreading.

A cyber-attack likelihood value may be determined or computed by applying respective weight (e.g., customizable, predetermined, or a combination thereof weights) to each of the factor scores or values (e.g., alerts, vulnerabilities, direct connectivity with public entities, proximity to infected/vulnerable entities, for instance Tables X-XI), as described herein.

The cyber-attack impact value can be determined based on an entity criticality value, a network criticality value, a proximity to critical network or entities value, or a combination thereof. The entity criticality value is based on the function of the device, the location, and the amount of risk of danger to property and life a particular entity has. The entity criticality value can reflect how much direct impact in terms of damage or cost if that entity goes down or stops functioning. The function may be based on the device type of an entity and the function that it performs (e.g., part of fire safety or part of an HVAC temperature control system). For example, a fire safety PLC controlling a sprinkler system in a production environment may have a high device criticality value of 5 (highest) because if the fire safety PLC fails there could be damage to property, human life, or both. As another example, a conveyor safety PLC that controls the speed of a conveyor belt in a production environment may have a high device criticality value of 4 (high) because if the conveyor speed gets out of control, packages or other objects may fly off the conveyor belt and damage product, or other property.

As yet another example, a file server that stores files for a business process or business documents may have a low device criticality value of 2 (low) because if the file server fails there is a low chance or probability of harm to property, human life, or both.

The network criticality value is based on how an entity is related to or networked with a critical entity. The network criticality may reflect that one or more critical devices are dependent on a particular device or entity. For example, a switch that communicatively couples a fire safety PLC to one or more sensors may have a network criticality value of 4 (high) because if the network switch goes down or fails, the communication of one or more sensors may no longer be able to provide information to the safety PLC which could prevent warning about impending danger and damage to property, human life, or both.

As another example, an applications server running a data analytics applications may have a network criticality value of 2 (low) because there are backups of the server and there is no device in its network whose failure may harm to human life, property, or both.

Network criticality may further be based on aspects of the location related to the entity. For example, if a safety PLC is located at an unmanned plant it will have a lower network criticality value than a safety PLC at a plant that has hundreds of people.

The proximity to critical networks or entities value is based on how close an entity is to one or more critical networks or entities. This value can reflect the risk that is created by an entity being close (e.g., a short number of network hops) to critical networks or entities. For example, if a HMI device is communicatively coupled to a switch where a fire safety PLC is communicatively coupled, the HMI device may have a proximity to critical network or entities value of 1 (proximity to critical devices score is 0 or 1, where 1 indicates proximity) because if the HMI device were to become infected or compromised, it could put the fire safety PLC at risk.

For example, if a server communicating with a PLC stops or a sensor connected to a safety PLC stops functions, or if a PLC acts as a gateway to other PLCs fails causing an HMI, SCADA server, or application controller to not be able to provide information to a PLC, in each of these cases information cannot get to a PLC and because of the proximity to these PLCs, the failure of a single device has a very large impact. In other words, a failure of the aforementioned devices causes a ripple effect of problems to occur with respect to the PLCs.

A cyber-attack impact value may be determined or computed by applying respective weight (e.g., customizable, predetermined, or a combination thereof weights) to each of the factor scores or values (e.g., entity criticality, network criticality, proximity to critical networks/entities, for instance Tables X-XI), as described herein.

At block 308, a cyber-attack risk based on the cyber-attack likelihood value and a cyber-attack impact value associated with the entity are determined. In some embodiments, the cyber-attack risk is calculated by multiplying the cyber-attack likelihood value and cyber-attack impact value. For example, if the cyber-attack likelihood is 10 and the cyber-attack impact is 0.5, then the cyber-attack risk will be 5 or 50%.

At block 310, an operational failure likelihood value and an operational failure impact value associated with the entity are determined. In some embodiments, the operational failure likelihood value is based on alerts associated with an entity. Embodiments may support additional or other aspects being used to determine an operational failure likelihood value.

The alerts that may be used for determining the operational failure likelihood value can be from alert multiple categories including, but not limited to, operational malfunction, misconfiguration, misuse, service restored, and downtime. Custom events or alerts may also be supported.

The operational malfunction alerts may be based on an entity malfunctioning or misbehaving. Alerts associated with malfunction may be based on a device with event buffer full, a device with corrupt configuration, a field measurement changing too often, a field measurement not updated for a long period of time, a field measurement is too large, unexpected restart(s) of field device, a device time desynchronized with the sensor time, a device requiring local time synchronization, a device with an operational problem, unexpected restart(s) of a device, a device with an analog/digital (A/D) reference point out of range, a device with mode changes in advanced applications, a device with firmware failure, a device with hardware failure, a device with corrupted configuration data block, a device with corrupted operating parameter block, a device with primary power source unavailable, unexpected reset(s) of field device, a field device requiring time synchronization, which may be used to determine a risk for a destination of a communication associated with the alert.

For example, an alert that indicates a device has a field valve changing too often, the device unexpected starts or stops, the device is not synchronized with a sensor, a field device with an operational problem, or a field device with more changes in advanced applications may have an operational failure likelihood score or value of 7 through 8.9 (high). The operational malfunction value can further be based on the device operating outside of expected parameters. For example, a PLC is operating a conveyor belt above the speed limit or operating a device with too high of an rpm.

The misconfiguration alerts may be based on an entity having a configuration that does not match an expected configuration or a configuration standard. Alerts associated with misconfiguration may be based on alerts for a device with an unstable connection, a device with many failed connection attempts, a spanning tree protocol (STP) network topology change, an entity not receiving answers to DHCP requests, an entity not receiving answers to DNS requests, an entity not receiving NTP updates, an entity with automatically assigned IP (e.g., Zeroconf IP addresses are typically not used in production environments), which may be used to determine a risk for a source and a destination of a communication associated with the alert.

Alerts associated with misconfiguration may be based on alerts for an invalid parameter error from a field device, an operation already executing error from a field device, an unknown object error from a field device, an unsupported message type error from a field device, an already in requested mode error from a device, an attribute list error from a device, an attribute not settable error from a device, an attribute not supported error from a device, a buffer overflow error from a device, a connection failure error from a device, a connection lost error from a device, a device state conflict error from a device, a fragmentation of primitive value error from a device, a server general failure error from a device, an invalid attribute value list error from a device, an invalid attribute value error from a device, an invalid member ID error from a device, an invalid parameter error from a device, an invalid reply received error from a device, a key failure in path error from a device, a member not settable error from a device, a message format error from a device, a missing attribute list entry data error from a device, a no stored attribute data error from a device, a not enough data error from a device, an object already exists error from a device, an object does not exist error from a device, an object state conflict error from a device, a path destination unknown error from a device, a path segment error from a device, a path size invalid error from a device, a privilege violation error from a device, a resource unavailable from a device, a routing failure for request too large error from a device, a routing failure for response too large error from a device, a service not supported error from a device, a store operation failure error from a device, a service fragmentation not in process error from a device, a too much data error from a device, an unexpected attribute in list error from a device, an unknown error from a device, a vendor specific error from a device, a write-once value or medium already written error from a device, an invalid parameter error from field device, an unknown object error from field device, an unsupported message type error from field device, a path unavailable error from a gateway, a gateway target device failed to respond error from a gateway, an illegal data address error from a slave, an illegal data value error from a slave, an illegal function error from a slave, a memory parity error from a slave, a server device failure error from a slave, a PLC incorrect password entered, and a PLC password not set, which may be used to determine a risk for a destination of a communication associated with the alert.

For example, a device may be determined to have a corrupt configuration (e.g., does not match an approved configuration) based on a comparison of the configuration to an approved configuration.

The misuse alerts may be based on a potential dangerous operation of a device, for instance the device being stopped or reprogrammed, changes to the configuration (e.g., program/logic of a PLC), or a combination thereof. The misuse can be based on alerts including, but not limited to, a configuration download command, a configuration upload command, a device reset command, a device start command, a device stop command, a create object command, a disable device communication command, a delete object command, a device reinitialization command, a disable device communication command, a set IP address command, a run program command, a stop program command, a database download command, a change of device logic and/or configuration, a field device in local control for a long period of time, a device restart command, an application stop command, configuration download command, a configuration upload command, a slave reset command, a controller debug command, a controller reset command, a controller start/restart command, a controller stop command, a create change log command, a create data table command, a create executable command, a create input/output (I/O) connection command, a create I/O map command, a create metadata definition command, a create program command, a create symbol command, a create trend command, a create user memory command, a create user task command, a delete change log command, a delete data table command, a delete executable command, a delete I/O connection command, a delete I/O map command, a delete metadata definition command, a delete program command, a delete symbol command, a delete trend command, a delete user memory command, a delete user task command, a disable all I/O forces command, a disable all sequential function chart (SFC) forces command, a configuration download command, an edit Ethernet TCP/IP configuration command, an enable all I/O forces command, an enable all SFC forces command, a firmware update command, a force/unforce tag command, a lock controller command, a modify executable code segment command, a remove all I/O forces command, a remove all SFC forces command, a set wall clock time command, a unlock controller command, a configuration upload command, a device cold restart command, an offline configuration download command, a function block start command, a function block stop command, a firmware update command, an online function block download command, a function block delete command, a device reboot command, a device stop command, a device warm restart command, a change password command, a configuration upload command, a debug command, an apply I/O force command, a remove I/O force command, a delete program command, a program download command, a start command, a stop command, a delete program command, a program download command, a program upload command, a controller reset command, a set clock date time command, a controller start command, a controller stop command, a delete hardware configuration command, a delete program invocation command, an engineering station going online with the PLC, a firmware update command, a hardware configuration download command, a program download command, a start program invocation command, a stop program invocation command, a take control command without corresponding relinquish control, an unsafe take control command, a connection from engineering station, a diagnostics clear counters command, a diagnostics force listen-only mode command, a diagnostics restart communications command, a reset communication link command, a read device identification command, a report slave id command, a connection from engineering station, a diagnostics clear counters command, a diagnostics force listen-only mode command, a diagnostics restart communications command, a reset communication link command, a read device identification command, a report slave id command, a diagnostics force listen-only mode command, a firmware replacement command, a reset communication link command, a read device identification command, a report slave id command, a download command, a reset command, a start command, a stop command, an upload command, a set advanced remote terminal unit (RTU) application mode command, a download configuration data block (CDB) command, a upload configuration data block (CDB) command, a suppress data command, a upload operating parameter block (OPB) command, a reset RTU command, a synchronize time command, a configuration upload command, a configuration upload command, a hardware configuration download command, a hardware configuration download command, a remote reset command, a remote reset command, a set IP address command, a remote run command, a remote run command, a remote stop command, a remote stop command, a CPU transition to stop command, a configuration download command, a erase command, a firmware update command, a force/unforce command, a new password command, a PLC start/stop command, a PLC stop command, a set time command, a configuration upload command, an acknowledge alarm command, an override alarm command, a configuration upload command, a firmware update command, a hardware configuration download command, a apply I/O force command, a remove I/O force command, an online program download command, a set safety control station (SCS) security level 0 command, a set safety control station (SCS) security level 1 command, a set safety control station (SCS) security level 2 command, a set date/time command, a device start command, and a device stop command, which may be used to determine a risk for a destination of a communication associated with the alert.

The service restored alerts can include alerts based on a variety of devices having communications restored after a period of downtime. The downtime alerts can include alerts that a device has lost each of its connections (e.g., protocol connections), which can be used to determine a risk for a source and a destination of a communication associated with the alert. This may be due to networking problems (e.g., unstable network links), device malfunction, or a device being decommissioned.

The operational failure impact value can be based on entity criticality, network criticality, and proximity to critical networks/entities. The operational failure impact value can be based on the values for entity criticality, network criticality, and proximity to critical networks/entities, as described with respect to cyber-attack impact value. The weights that may be applied (e.g., multiplied by) to the entity criticality, network criticality, and proximity to critical networks/entities values may be different than the weights applied to for cyber-attack impact values (e.g., Tables X-XI). In some embodiments, the proximity to critical networks/entities is optional with respect to the operational failure impact.

At block 312, an operational risk based on the operational failure likelihood value and the operational failure impact value associated with the entity are determined. In some embodiments, the operational risk is calculated by multiplying the operational failure likelihood value and operational failure impact value. For example, if the operational failure likelihood is 10 and the operational failure impact is 0.75, then the cyber-attack risk will be 7.5 or 75%.

At block 314, a risk value for the entity based on the cyber-attack risk and the operational failure risk are determined. The risk value may be determined using the maximum of the cyber-attack risk and operational failure risk, as described herein. The monetary impact may also be used in determining the risk value, as described herein.

At block 316, the risk value for the entity is stored. The risk value may be stored and then block 302 or 304 may be performed. The risk value may be displayed for each entity or one or more network portions and the entities may be sorted based on risk value so that highest risk entities are listed first thereby allowing the risk mitigation actions to be prioritized for the entities with the highest risk.

At block 318, a risk value for a location based on a plurality of risk values associated with a plurality of entities is determined. The location may be a geographic region, a plant, a network, a subnetwork, or a network segment, as described herein. In some embodiments, the risk value for a location can be computed as the average or maximal risk at a location.

Figure 4:
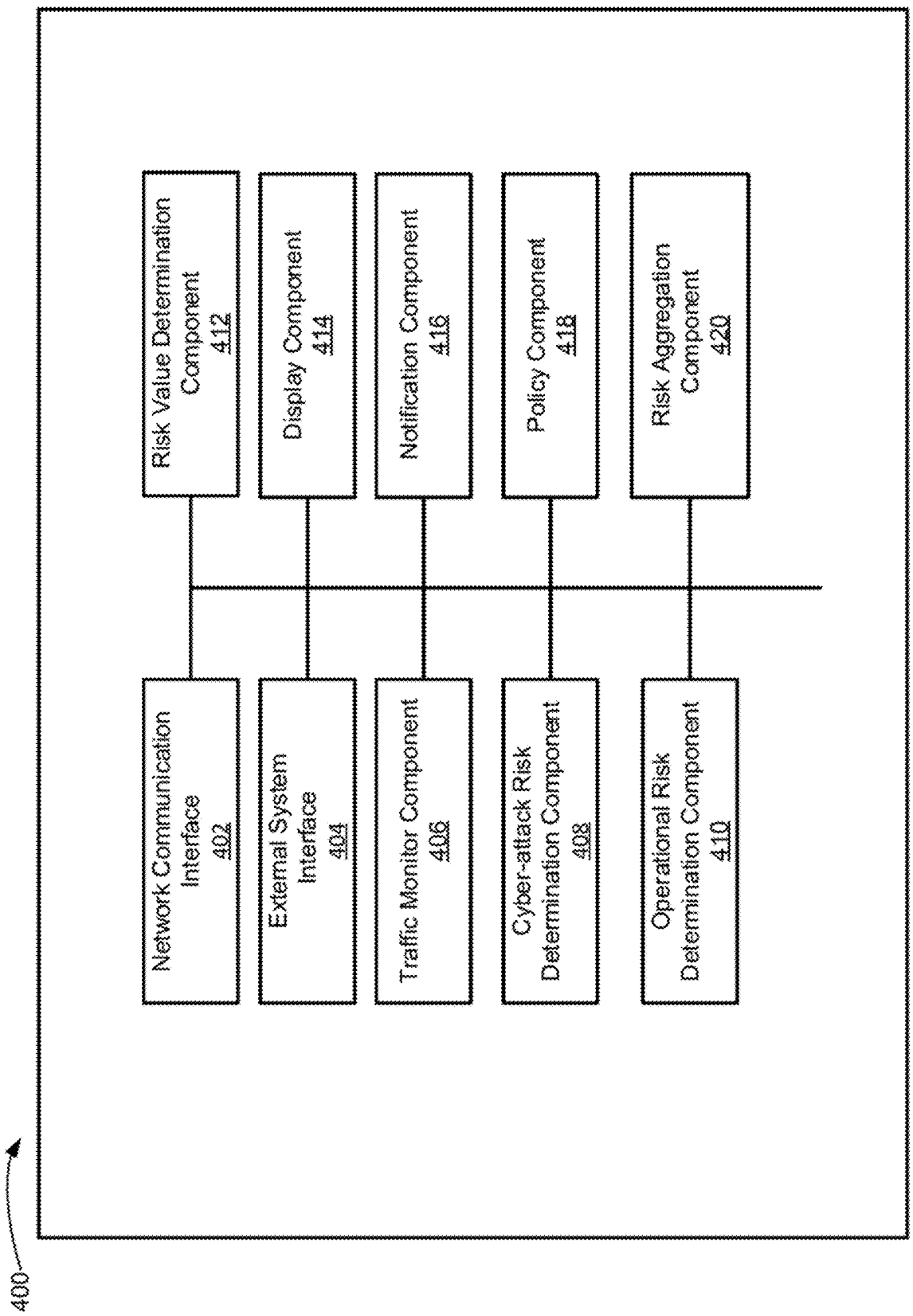
FIG. 4 depicts illustrative components of a system for determining a risk score in accordance with one implementation of the present disclosure.

FIG. 4 illustrates example components used by various embodiments. Although specific components are disclosed in system 400, it should be appreciated that such components are examples. That is, embodiments are well suited to having various other components or variations of the components recited in system 400. It is appreciated that the components in system 400 may operate with other components than those presented, and that not all of the components of system 400 may be required to achieve the goals of system 400.

FIG. 4 depicts illustrative components of a system for determining a risk score in accordance with one implementation of the present disclosure. Example system 400 or access manager 400 includes a network communication interface 402, an external system interface 404, a traffic monitor component 406, a cyber-attack risk determination component 408, an operational failure risk determination component 410, a display component 414, a notification component 416, a policy component 418, and a risk aggregation component 420. The components of system 400 may be part of a computing system or other electronic device (e.g., network monitor device 102 or network monitor device 280) or a virtual machine or device and be operable to monitor and one or more entities communicatively coupled to a network, monitor network traffic, and perform determine comprehensive risk scores, as described herein. For example, the system 400 may further include a memory and a processing device, operatively coupled to the memory, which may perform the operations of or execute the components of system 400. The components of system 400 may access various data and characteristics associated with an entity (e.g., network communication information) and data associated with one or more entities. It is appreciated that the modular nature of system 400 may allow the components to be independent and allow flexibility to enable or disable individual components or to extend, upgrade, or combination thereof components without affecting other components thereby providing scalability and extensibility. System 400 may perform one or more blocks of flow diagram 300.

Communication interface 402 is operable to communicate with one or more entities (e.g., network device 104, firewalls 202-206, switches 210-220, other devices coupled thereto, devices 230-262, etc.) coupled to a network that are coupled to system 400 and receive or access information about entities (e.g., device information, device communications, device characteristics, etc.), access information as part of a passive scan, send requests of an active scan, receive active scan results or responses (e.g., responses to requests), as described herein. The communication interface 402 may be operable to work with one or more components to initiate access to characteristics or determination of characteristics of an entity to allow determination of one or more attributes which may then be used for device compliance, asset management, standards compliance, etc., as described herein. Communication interface 402 may be used to receive and store network traffic for determining device attributes, as described herein.

External system interface 404 is operable to communicate with one or more third party, remote, or external systems to access information including characteristics or attributes about an entity. External system interface 404 may further store the accessed information in a data store. For example, external system interface 404 may access information from a vulnerability assessment (VA) system to enable determination of one or more compliance or risk characteristics associated with the entity. External system interface 404 may be operable to communicate with a vulnerability assessment (VA) system, an advanced threat detection (ATD) system, a mobile device management (MDM) system, a firewall (FW) system, a switch system, an access point (AP) system, etc. External system interface 404 may query a third party system using an API or CLI. For example, external system interface 404 may query a firewall or a switch for information (e.g., network session information) about an entity or for a list of entities that are communicatively coupled to the firewall or switch and communications associated therewith. In some embodiments, external system interface 404 may query a switch, a firewall, or other system for information of communications associated with an entity.

Traffic monitor component 406 is operable to monitor network traffic to determine if a new entity has joined the network or an entity has rejoined the network and monitor traffic for analysis by cyber-attack risk determination component 408 and operational risk determination component 410, as described herein. Traffic monitor component 406 may have a packet engine operable to access packets of network traffic (e.g., passively) and analyze the network traffic. The traffic monitor component 406 may further be able to access and analyze traffic logs from one or more entities (e.g., network device 104, system 150, or aggregation device 106) or from an entity being monitored. The traffic monitor component 406 may further be able to access traffic analysis data associated with an entity being monitored, e.g., where the traffic analysis is performed by a third party system.

Cyber-attack risk determination component 408 is operable to determine a cyber-attack likelihood value and a cyber-attack impact value associated with an entity, as described herein. The cyber-attack likelihood value may be based on the alerts, vulnerabilities, direct connectivity with public entities, proximity to infected/vulnerable entities, or a combination thereof, and associated weights, as described herein. The cyber-attack impact value may be based on device criticality, network criticality, proximity to critical networks/entities, or a combination thereof, and associated weights, as described herein.

Cyber-attack risk determination component 408 is further operable to determine a cyber-attack risk based on the cyber-attack likelihood value and a cyber-attack impact value associated with the entity, as described herein. For example, the cyber-attack risk may be determined by multiplying the cyber-attack likelihood value and a cyber-attack impact value.

Operational risk determination component 410 is operable to determine an operational failure likelihood value and an operational failure impact value associated with an entity, as described herein. The operational failure likelihood value may be based on the alerts, vulnerabilities, direct connectivity with public entities, proximity to infected/vulnerable entities, or a combination thereof, and associated weights, as described herein. The operational failure impact value may be based on device criticality, network criticality, proximity to critical networks/entities, or a combination thereof, and associated weights, as described herein.

Operational risk determination component 410 is further operable to determine an operational failure risk based on the operational failure likelihood value and the operational failure impact value associated with the entity, as described herein. For example, the operational failure risk may be determined by multiplying the operational failure likelihood value and the operational failure impact value.

Risk aggregation component 420 is operable to determine a risk value based on the cyber-attack risk and the operational risk, as described herein. In some embodiments, the risk value associated with an entity may be based on a maximum of the cyber-attack risk and the operational risk. The risk value may be stored, displayed, the highest risk entities indicated or highlighted and used to prioritize a response, or the like, as described herein. Risk aggregation component 420 may further use multiple risk values to determine a risk value for a location or one or more portions of one or more networks, as described herein.

Display component 414 is configured to optionally display one or more graphical user interfaces or other interfaces (e.g., command line interface) for depicting various information associated with entities or devices, alerts, asset management, and compliance with standards and other policies, as described herein. In some embodiments, display component 414 may display or render a network graph of entities, attributes associated with each entity or device, risk values, and indications of security policy alerts, compliance alerts, etc.

Notification component 416 is operable to initiate one or more notifications based on the results of monitoring communications or attributes of one or more entities (e.g., alerting of a new devices or high risk values, etc.), as described herein. The notification may be any of a variety of notifications, e.g., IT ticket, email, SMS, a HTTP notification, etc., as described herein.

Policy component 418 is operable for initiating or triggering one or more remediation actions or security actions according to one or more policies, e.g., based on one or more risk values, as described herein. Policy component 418 may further be configured to perform other operations including checking compliance status, finding open ports, etc. Policy component 418 may restrict network access, signal a patch system or service, signal an update system or service, etc., as described herein. The policy component 418 may thus, among other things, invoke automatically patching, automatically updating, and automatically restrict network access of an entity (e.g., that has out-of-date software or based on access rule violation or attempted violation).

The actions may include restricting network access to a particular level (e.g., full, limited, or no network access), remediation actions (e.g., triggering patch systems or services, triggering update systems or services, triggering third party product action, etc.), informational actions (e.g., sending an email notification to a user or IT administrator or creating an IT ticket reflecting the level of compliance), and logging actions (e.g., logging or storing the compliance level).

The system 400 may be software stored on a non-transitory computer readable medium having instructions encoded thereon that, when executed by a processing device, cause the processing device to select an entity communicatively coupled to a network and determine a cyber-attack likelihood value and a cyber-attack impact value associated with the entity. The instructions may further cause the processing device to determine a cyber-attack risk based on the cyber-attack likelihood value and a cyber-attack impact value associated with the entity. The instructions may further cause the processing device to determine an operational failure likelihood value and an operational failure impact value associated with the entity and determine an operational failure risk based on the operational failure likelihood value and the operational failure impact value associated with the entity. The instructions may further cause the processing device to determine a risk value for the entity based on the cyber-attack risk and the operational risk and store the risk value for the entity.

In some embodiments, the cyber-attack likelihood value is based on at least one of an alert, a vulnerability, a direct connection with a public entity, or a proximity to an infected or vulnerable entity. In various embodiments, the cyber-attack impact value is based on at least one of entity criticality, network criticality, or proximity to a critical entity. In some embodiments, the operational failure likelihood value is based on an alert. In various embodiments, the operational failure impact value is based on at least one of an entity criticality, a network criticality, or proximity to a critical entity. In some embodiments, wherein the risk value for the entity is a maximum of the cyber-attack risk and the operational failure risk. In various embodiments, the instructions may further cause the processing device to determine a risk value for a location based on a plurality of risk values associated with a plurality of entities associated with the location. The location may be at least one of a geographic region, a plant, a network, or a network segment.

Figure 5:
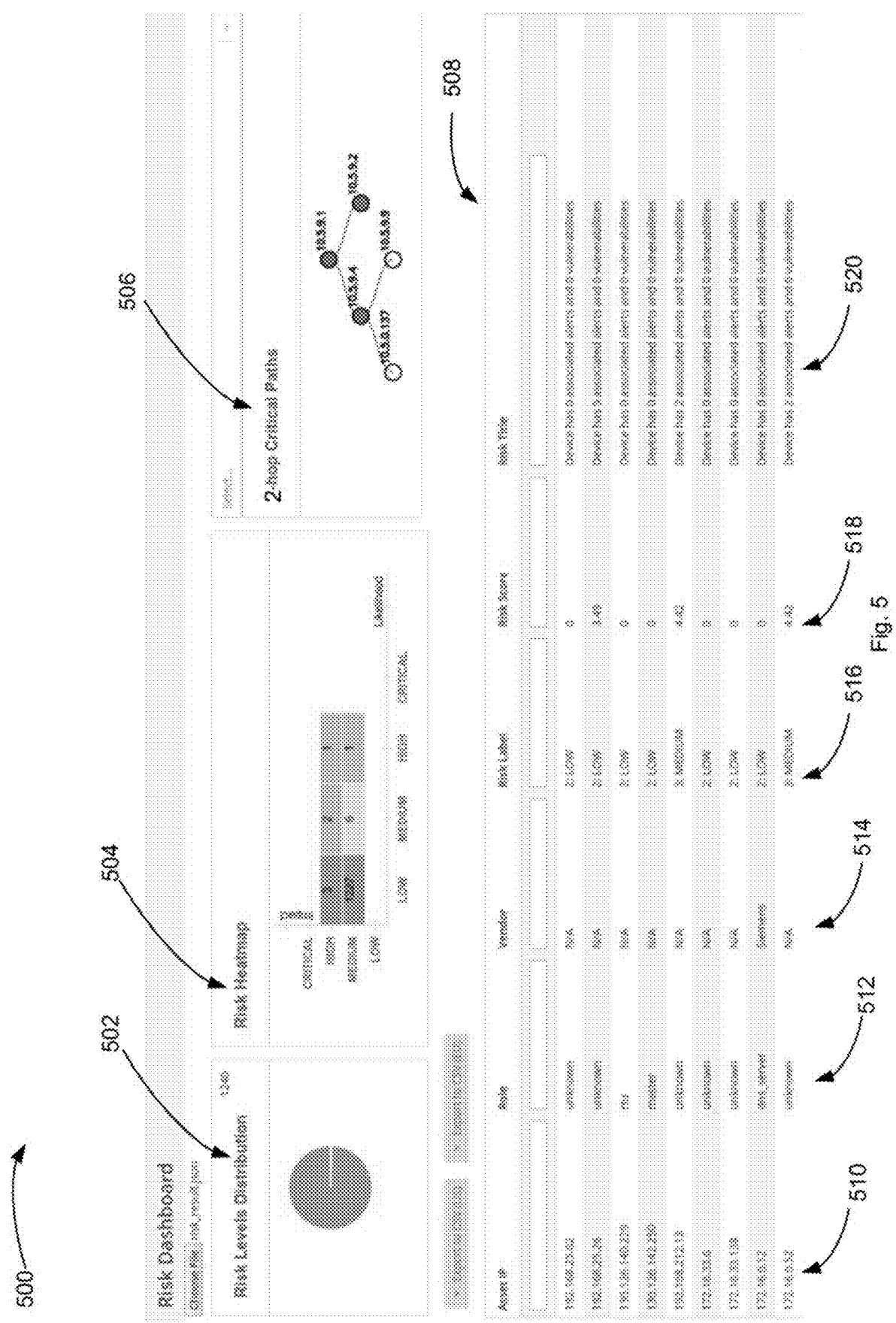
FIG. 5 depicts a diagram of aspects of an example graphical user interface for viewing and selecting risk data in accordance with one implementation of the present disclosure.

While example GUI 500 of FIG. 5 may be described with respect to devices or device groups, embodiments support other entities (e.g., users, services, etc.). GUI 500 may be rendered or displayed by a device (e.g., network monitor device 102 or network monitor device 280).

FIG. 5 depicts a diagram of aspects of an example graphical user interface for viewing and selecting risk data in accordance with one implementation of the present disclosure. Example graphical user interface (GUI) 500 is configured for viewing risk values for various entities and selecting risk values for one or more entities to focus on or for getting more information (e.g., drilling down). Example GUI 500 includes risk levels distribution area 502, risk heatmap area 504, 2-hop critical path area 506, and table area 508.

Risk levels distribution area 502 graphically depicts a distribution of risk levels for the entities. In some embodiments, the distribution of risk levels may be displayed as a pie chart. Embodiments may support other graphical depictions of the distribution of risk levels.

Risk heatmap area 504 graphically depicts a heatmap using colors and the quantity of entities at risk at each position on the heatmap. Risk heatmap area 504 includes an x axis (or horizontal axis) with the likelihood ranging from low to medium to high to critical and a y axis (or vertical axis) with the impact ranging from low to medium to high to critical. In some embodiments, the heatmap area 504 depicts the risk for entities on a network. In various embodiments, the heatmap area 504 may depict cyber-attack risk or operational failure risk (e.g., a per a user configuration).

2-hop critical path area 506 graphically depicts with a network graph, entities and associated IP addresses, for entities within 2 hops of the selected entity (e.g., displayed on top of the graph) such that there exist vulnerabilities in those entities that could be exploited to attack the selected entity. The entities may be devices that are within 2 hops of portions of the network that involve safety systems, high revenue systems, or other critical parts of a business.

Table area 508 graphically depicts a table of entities, details associated with the entities, risk scores, and risk related information. Table area 508 includes asset IP column 510, role column 512, vendor column 514, risk label column 516, risk score column 518, and risk title column 520.

Asset IP column 510 lists the IP address of each asset or entity that is being displayed in table area 508. Role column 512 lists the role of each entity listed in table area 508. Vendor column 514 lists the vendor, where available, of each entity listed in table area 508. Risk label column 516 lists a risk label (e.g., low, medium, high, or critical) for each entity listed in table area 508. Risk score column 518 lists a risk score or value for each entity listed in the table area 508. Risk title column 520 lists the number of alerts and vulnerabilities associated with each entity listed in the table area 508.

Figure 6:
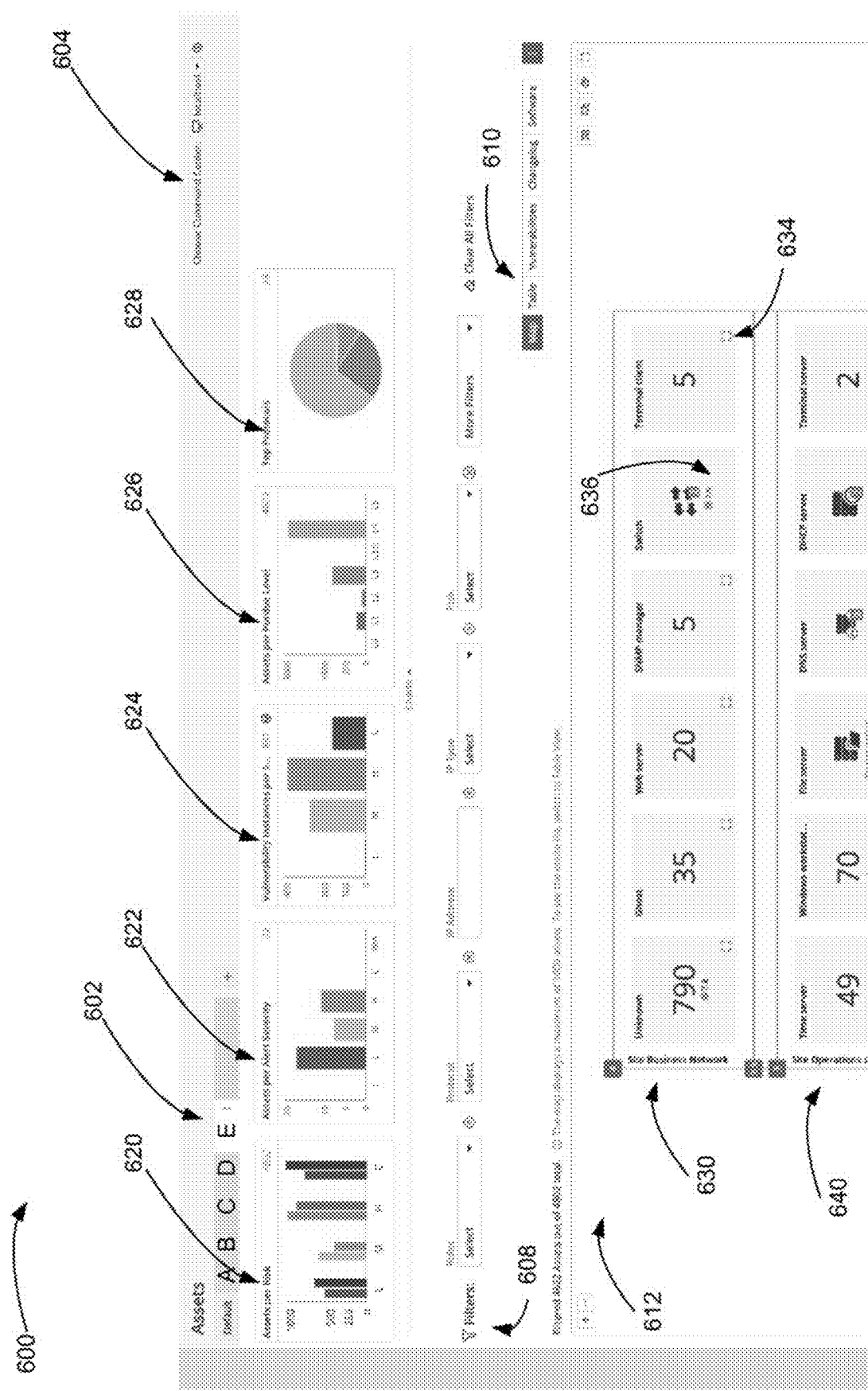
FIG. 6 depicts a diagram of aspects of an example graphical user interface for viewing and selecting entity and risk data in accordance with one implementation of the present disclosure.

FIG. 6 depicts a diagram of aspects of an example graphical user interface for viewing and selecting entity and risk data in accordance with one implementation of the present disclosure. Example graphical user interface (GUI) 600 is configured for viewing risk values and analytics for various entities and selecting one or more entities to focus on or for getting more information (e.g., drilling down). Example GUI 600 includes view tab area 602, graphs 620-628, command center selection area 604, filters area 608, visualization control area 610, and visualization area 612.

View tab area 602 allows selection of various tabs, each tab associated with customizable graphs and view configurations with respect to the elements of example graphical user interface 600 (e.g., a customized view of each user). Command center selection area 604 allows selection of a risk monitoring system (e.g., system 400) for viewing risk data of one or more networks associated therewith.

Graphs 620-628 include assets per risk graph 620, assets per alert severity graph 622, vulnerability instances per severity graph 624, assets per Purdue Level graph 626, and top protocols graph 628.

Assets per risk graph 620 depicts respective quantities of cyber-attack risk and operational failure risk with associated bars for each risk level. Assets per risk graph 620 includes an x axis (or horizontal axis) with risk levels ranging from low to medium to high to critical and a y axis (or vertical axis) with the quantity of assets.

Assets per alert severity graph 622 depicts a quantity of assets for each alert severity (e.g., informational, low, medium, high, critical, not available (N/A)). Assets per alert severity graph 622 includes an x axis (or horizontal axis) with risk levels ranging from low to medium to high to critical and a y axis (or vertical axis) with the quantity of assets.

Vulnerability instances per severity graph 624 depicts the quantity of vulnerability instances per risk severity. Vulnerability instances per severity graph 624 includes an x axis (or horizontal axis) with risk severity levels ranging from low to medium to high to critical and a y axis (or vertical axis) with the quantity of vulnerability instances.

Assets per Purdue Level graph 626 depicts the quantity of assets per Purdue Level on one or more networks. In some embodiments, Purdue Level graph 626 is based on the Purdue Enterprise Reference Architecture (PERA) model, which is a concept model for industrial control system (ICS) network segmentation. Under the Purdue model, an ICS architecture may be divided into three zones and six levels. The three zones can include an enterprise zone, industrial demilitarized zone, and manufacturing or industrial zone. The enterprise zone includes Level 5: enterprise network and Level 4: site business and logistics. The industrial demilitarized zone allows for secure connections between enterprise zone networks and manufacturing or industrial zone networks, which often have different security requirements. The manufacturing zone includes Level 3: site operations, Level 2: area supervisory control, Level 1: basic control, and Level 0: the process. Assets per Purdue Level graph 626 includes an x axis (or horizontal axis) with Purdue Levels ranging from Level 0 to Level 5 and a y axis (or vertical axis) with the quantity of assets. Top protocols graph 628 depicts the amount of traffic that is associated with each of the protocols being used on one or more networks for communication. In some embodiments, top protocols graph 628 displays the amount of traffic per protocol on a pie chart.

Filters area 608 allows for filtering the assets and associated data based on role, protocol, IP address, IP type, risk, and other filters. Filters area 608 further includes an area for clearing all or resetting filters. The filters selected in filters area 608 may be used to filter the information (e.g., assets, risks, etc.) shown in visualization area 612.

Visualization control area 610 allows for customizing a view of data in visualization area 612 to show a map, a table, vulnerabilities, a changelog, and software being used. Visualization control area 610 further include a menu for choosing options for customizing the view of data in visualization area 612 (e.g., FIG. 7).

Visualization area 612 is operable for displaying information about assets, associated risks, etc., in a map, in a table, based on vulnerabilities, as a changelog, and a list of the software being used on one or more networks. As shown in FIG. 6, visualization area 612 show a map view (e.g., as selected in visualization control area 610) with map 630 and map 640. Map 630 depicts data for a business network and includes tiles for clusters of assets that behave in a similar manner or have been grouped based on a classification. Map 630 shows tiles for 79 unknown or unclassified devices, with a maximum risk of 7.9, 35 ghost devices (e.g., devices that do not respond to requests, for instance, a misconfigured device, a removed DHCP server, etc.), 20 web servers, five SNMP managers, two switches, with a maximum risk of 7.5 (in example risk area 636), and five terminal clients. Map 630 shows tiles for groups of entities or assets within Purdue level 4 (as indicated by the upper boxed number on the left side of map 630). Each of the tiles includes an expand button 634 which allows a user to select a tile and see tiles for the group of assets for the selected tile. For example, clicking or selecting expand button 634 may show details of each of the five terminal clients. Expand button 634 thereby allows a user to drill down into details of assets including IP address, risk levels, etc.

Map 640 depicts data for an operations network and includes tiles for 49 time servers, 70 workstations, a file server, three DNS servers, two DHCP servers, and two terminal servers (e.g., within Purdue level 3).

Figure 7:
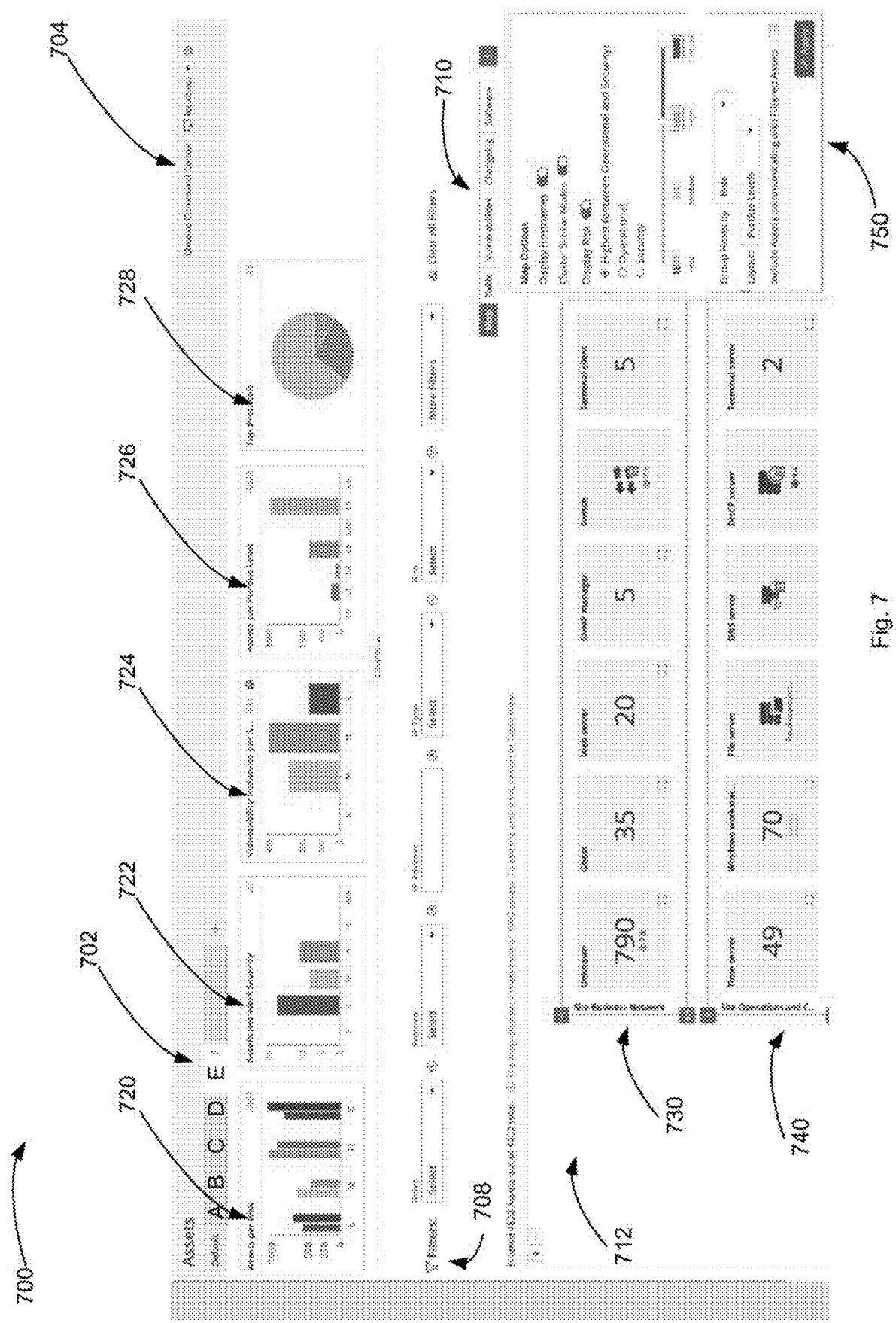
FIG. 7 depicts a diagram of aspects of an example graphical user interface for viewing and selecting entity and risk data including display options in accordance with one implementation of the present disclosure.

FIG. 7 depicts a diagram of aspects of an example graphical user interface for viewing and selecting entity and risk data including display options in accordance with one implementation of the present disclosure. Example graphical user interface (GUI) 700 is configured for viewing risk values and analytics for various entities and selecting one or more entities to focus on or for getting more information (e.g., drilling down). Example GUI 700 includes view tab area 702, graphs 720-728, command center selection area 704, filters area 708, visualization control area 710, visualization area 712, and map options area 750. Elements of FIG. 7 with similar elements numerals to those of FIG. 6 may have substantially similar functions and properties.

Map options area 750 includes options for customizing visualization area 712 including displaying hostnames, clustering similar nodes, displaying risk, displaying risk based on the highest risk between operational risk and security or cyber-attack risk, displaying operational risk, displaying security risk, selecting risk levels to be displayed, grouping hosts (e.g. by role), layout options (e.g., based on Purdue Levels or network communications), and including assets communicating with filtered assets.

Figure 8:
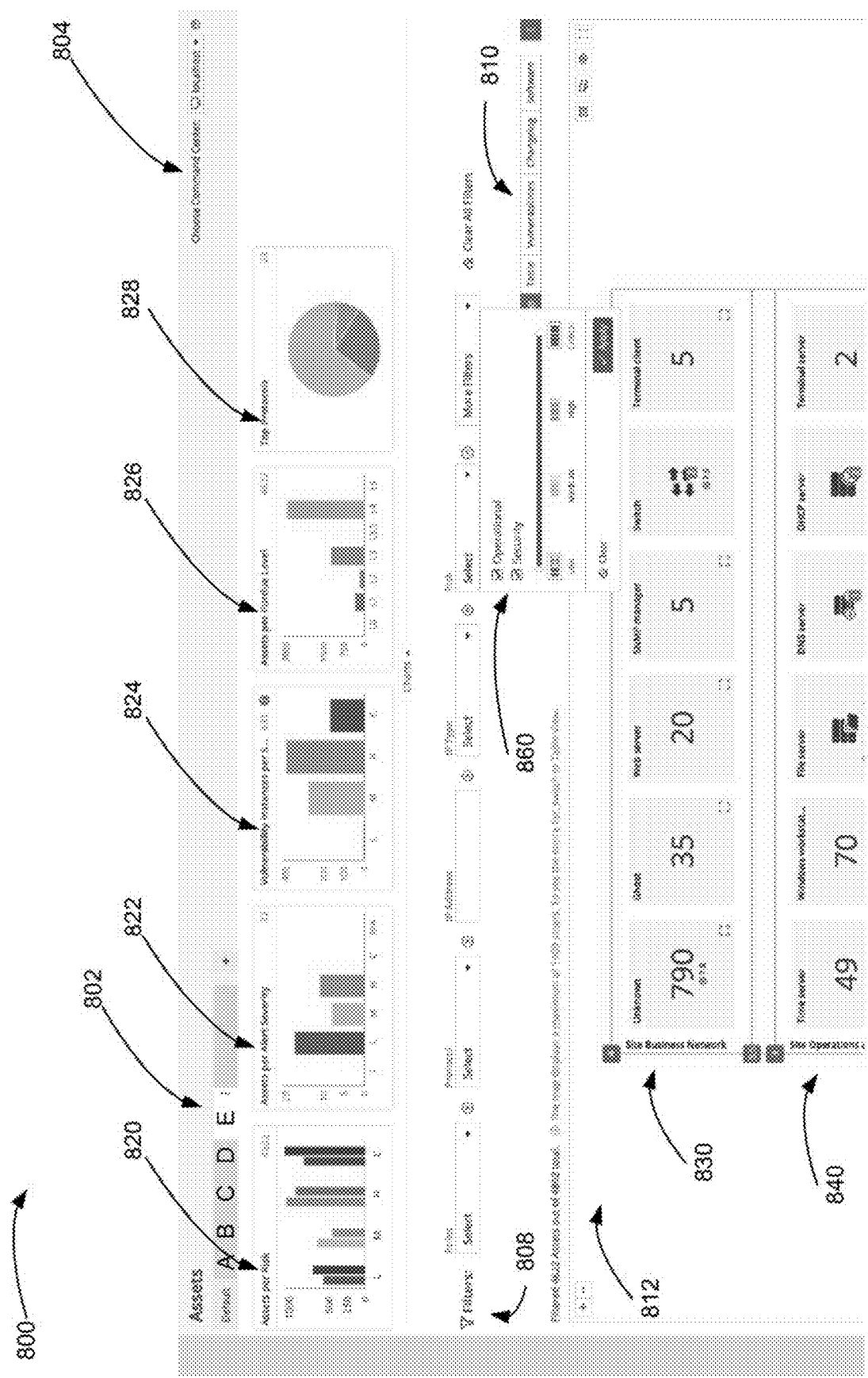
FIG. 8 depicts a diagram of aspects of an example graphical user interface for viewing and selecting entity and risk data including filtering options in accordance with one implementation of the present disclosure.

FIG. 8 depicts a diagram of aspects of an example graphical user interface for viewing and selecting entity and risk data including filtering options in accordance with one implementation of the present disclosure. Example graphical user interface (GUI) 800 is configured for viewing risk values and analytics for various entities and selecting one or more entities to focus on or for getting more information (e.g., drilling down). Example GUI 800 includes view tab area 802, graphs 820-828, command center selection area 804, filters area 808, visualization control area 810, visualization area 812, and risk filters area 860. Elements of FIG. 8 with similar elements numerals to those of FIG. 6 may have substantially similar functions and properties.

Risk filters area 860 may be displayed upon selecting the risk area of filters area 808. Risk filters area 860 includes check boxes for selecting operational risk or security risk and selecting risk levels (e.g., low, medium, high, and critical) to filter the assets and asset details shown in visualization area 812.

Figure 9:
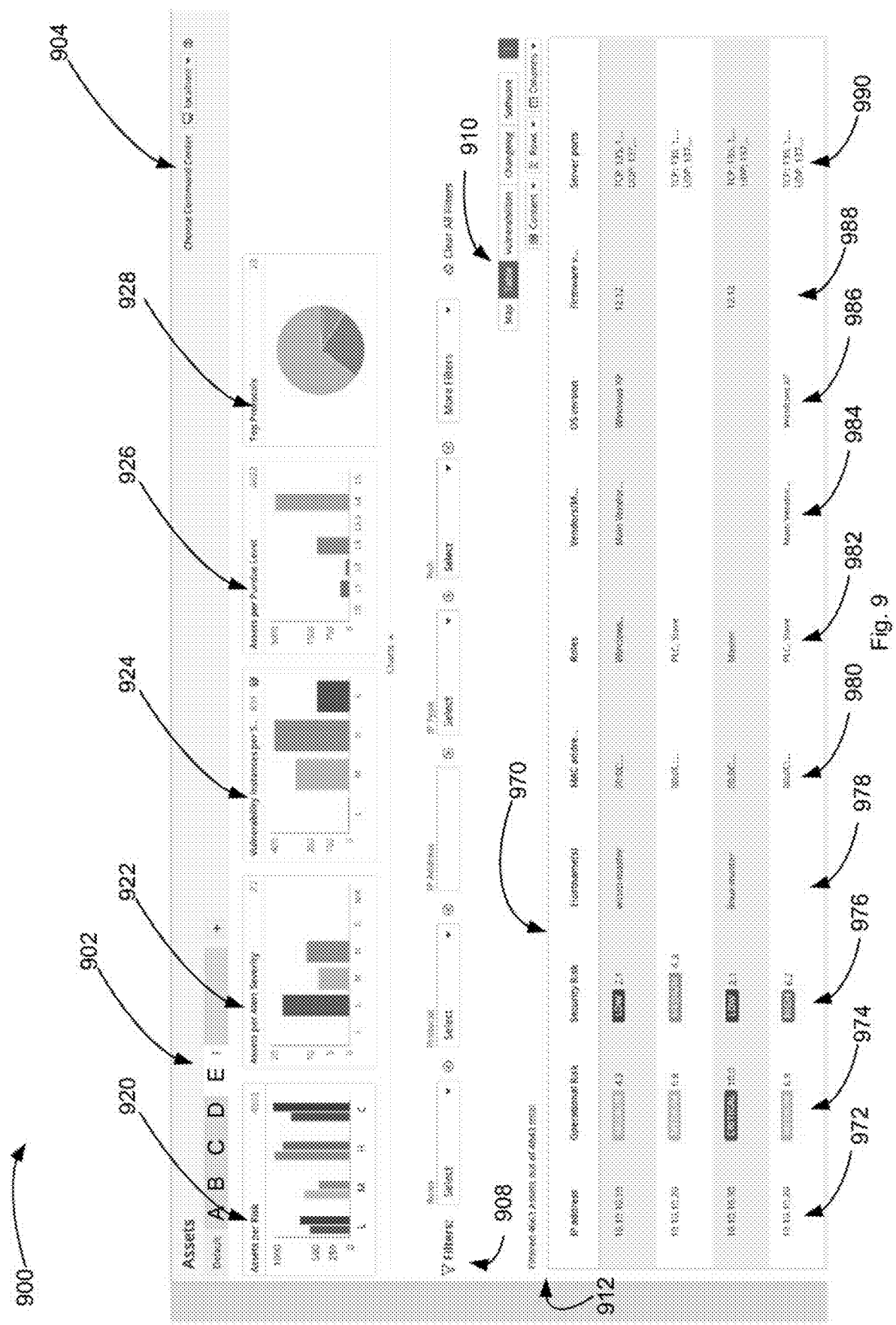
FIG. 9 depicts a diagram of aspects of an example graphical user interface for viewing and selecting entity and risk data in a table in accordance with one implementation of the present disclosure.

FIG. 9 depicts a diagram of aspects of an example graphical user interface for viewing and selecting entity and risk data in a table in accordance with one implementation of the present disclosure. Example graphical user interface (GUI) 900 is configured for viewing risk values and analytics for various entities and selecting one or more entities to focus on or for getting more information (e.g., drilling down). Example GUI 900 includes view tab area 902, graphs 920-928, command center selection area 904, filters area 908, visualization control area 910, visualization area 912, and table area 970. Elements of FIG. 9 with similar elements numerals to those of FIG. 6 may have substantially similar functions and properties.

Example GUI 900 depicts table area 970 being displayed in visualization area 912. Table area 970 graphically depicts a table of entities, details associated with the entities, entity information, risk scores, and risk related information. The data shown in table area 970 may be filtered using filters area 908. Table area 970 includes IP address column 972, operational risk column 974, security risk column 976, hostname column 978, MAC address column 980, roles column 982, vendors column 984, OS version column 986, firmware version column 988, and server ports 990.

IP address column 972 lists the IP address of each asset or entity that is being displayed in table area 970. Operational risk column 974 show a risk label (e.g., low, medium, high, or critical) and operational risk value or score for each entity listed in table area 970. Security risk column 976 show a risk label (e.g., low, medium, high, or critical) and security risk value or score for each entity listed in table area 970. Hostname column 978 lists the hostname, where available, of each entity listed in table area 970. MAC address column 980 lists the MAC address of each entity listed in table area 970. Roles column 982 lists the role of each entity listed in table area 970. Vendors column 984 lists the vendor, where available, of each entity listed in table area 970. OS version column 986 lists the operating system, where available, of each entity listed in table area 970. Firmware version column 988 lists the firmware version, where available, of each entity listed in table area 970. Server ports 990 lists the server ports that an entity is using to communicate with a server for each entity listed in table area 970.

Figure 10:
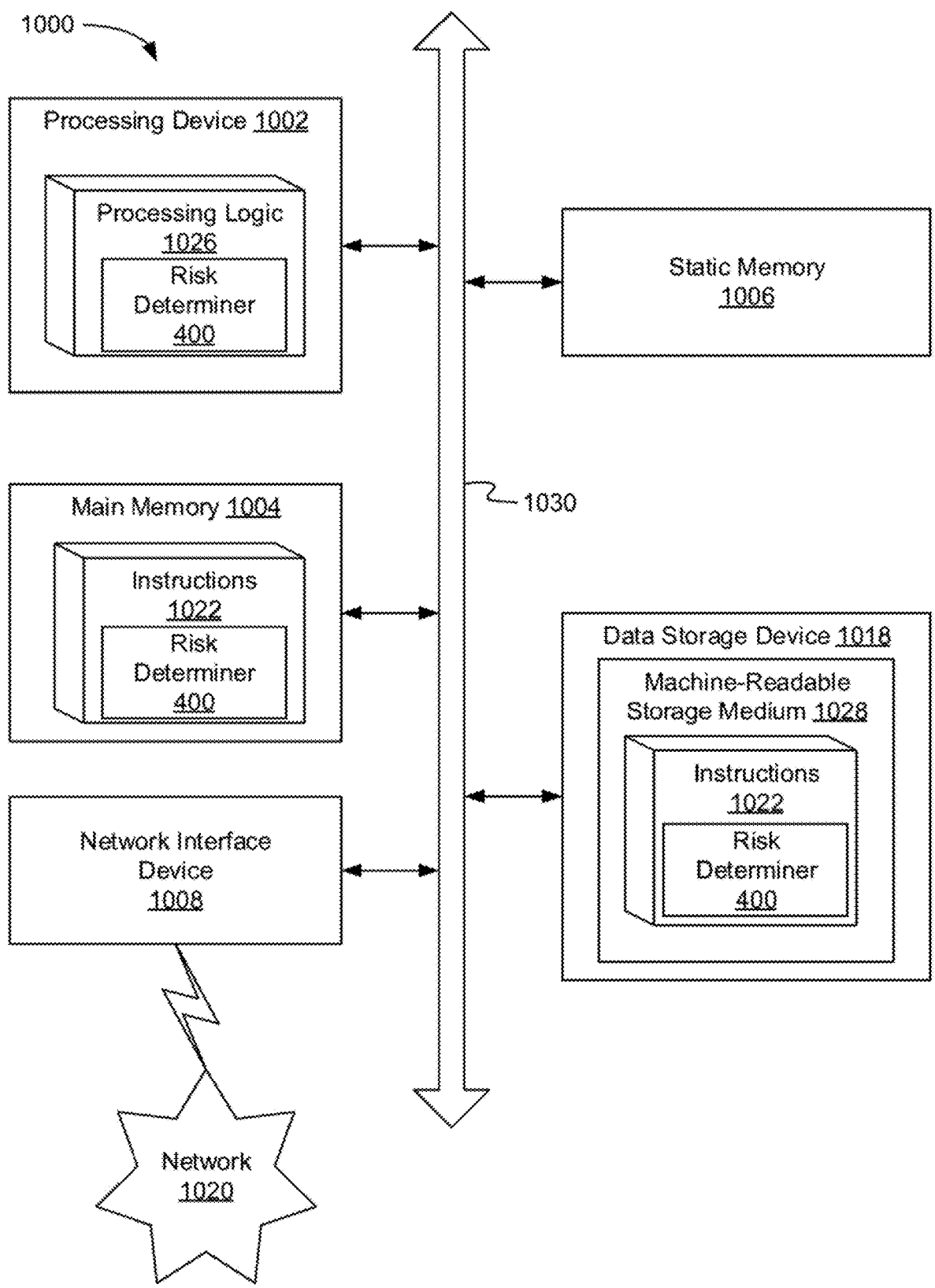
FIG. 10 is a block diagram illustrating an example computer system, in accordance with one implementation of the present disclosure.

FIG. 10 is a block diagram illustrating an example computer system, in accordance with one implementation of the present disclosure. FIG. 10 illustrates a diagrammatic representation of a machine in the example form of a computer system 1000 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 1000 may be representative of a server, such as network monitor device 102 running adaptive scanner 1000 to perform risk score or value determination based on cyber-attack risk and operational risk, as described herein.

The exemplary computer system 1000 includes a processing device 1002, a main memory 1004 (e.g., read-only memory (ROM), flash memory, dynamic random access memory (DRAM), a static memory 1006 (e.g., flash memory, static random access memory (SRAM), etc.), and a data storage device 1018, which communicate with each other via a bus 1030. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 1002 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 is configured to execute processing logic 1026, which may be one example of risk determiner 400 shown in FIG. 10, for performing the operations and steps discussed herein.

The data storage device 1018 may include a machine-readable storage medium 1028, on which is stored one or more set of instructions 1022 (e.g., software) embodying any one or more of the methodologies of operations described herein, including instructions to cause the processing device 1002 to execute risk determiner 400. The instructions 1022 may also reside, completely or at least partially, within the main memory 1004 or within the processing device 1002 during execution thereof by the computer system 1000; the main memory 1004 and the processing device 1002 also constituting machine-readable storage media. The instructions 1022 may further be transmitted or received over a network 1020 via the network interface device 1008.

The machine-readable storage medium 1028 may also be used to store instructions to perform a method for risk determination, as described herein. While the machine-readable storage medium 1028 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
performing, for each of a plurality of entities, a following comprising:
selecting an entity of the plurality of entities communicatively coupled to a network;
determining a cyber-attack likelihood value and a cyber-attack impact value associated with the entity;
determining a cyber-attack risk based on the cyber-attack likelihood value and a cyber-attack impact value associated with the entity;
determining an operational failure likelihood value and an operational failure impact value associated with the entity;
determining an operational failure risk based on the operational failure likelihood value and the operational failure impact value associated with the entity;
determining a risk value for the entity based on the cyber-attack risk and the operational failure risk;
storing the risk value for the entity;
determining a risk value for a location based on the plurality of risk values associated with the plurality of entities; and
performing a remediation action based on the risk value for the location, wherein the remediation action comprises at least one of changing network access of the entity, initiating a patch for the entity, or updating the entity.

2. The method of claim 1, wherein the cyber-attack likelihood value is based on at least one of an alert, a vulnerability, a direct connection with a public entity, or a proximity to an infected or vulnerable entity.

3. The method of claim 1, wherein the cyber-attack impact value is based on at least one of entity criticality, network criticality, or proximity to a critical entity.

4. The method of claim 1, wherein the operational failure likelihood value is based on an alert.

5. The method of claim 1, wherein the operational failure impact value is based on at least one of an entity criticality, a network criticality, or proximity to a critical entity.

6. The method of claim 1, wherein the risk value for the entity is a maximum of the cyber-attack risk and the operational failure risk.

7. The method of claim 1 further comprising:
determining a risk value for a location based on a plurality of risk values associated with a plurality of entities associated with the location.

8. The method of claim 7, wherein the location is at least one of a geographic region, a plant, a network, or a network segment.

9. A system comprising:
a memory; and
a processing device, operatively coupled to the memory, to:
perform for each of a plurality of entities:
select an entity of the plurality of entities communicatively coupled to a network;
determine a cyber-attack likelihood value and a cyber-attack impact value associated with the entity;
determine a cyber-attack risk based on the cyber-attack likelihood value and a cyber-attack impact value associated with the entity;
determine an operational failure likelihood value and an operational failure impact value associated with the entity;
determine an operational failure risk based on the operational failure likelihood value and the operational failure impact value associated with the entity;
determine a risk value for the entity based on the cyber-attack risk and the operational failure risk;
store the risk value for the entity;
determine a risk value for a location based on the plurality of risk values associated with the plurality of entities; and
perform a remediation action based on the risk value for the location, wherein the remediation action comprises at least one of changing network access of the entity, initiating a patch for the entity, or updating the entity.

10. The system of claim 9, wherein the cyber-attack likelihood value is based on at least one of an alert, a vulnerability, a direct connection with a public entity, or a proximity to an infected or vulnerable entity.

11. The system of claim 9, wherein the cyber-attack impact value is based on at least one of entity criticality, network criticality, or proximity to a critical entity.

12. The system of claim 9, wherein the operational failure likelihood value is based on an alert.

13. The system of claim 9, wherein the operational failure impact value is based on at least one of an entity criticality, a network criticality, or proximity to a critical entity.

14. The system of claim 9, wherein the risk value for the entity is a maximum of the cyber-attack risk and the operational failure risk.

15. The system of claim 9, wherein the processing device further to:
determine a risk value for a location based on a plurality of risk values associated with a plurality of entities associated with the location.

16. The system of claim 15, wherein the risk value for the entity is a maximum of the cyber-attack risk and the operational failure risk.

17. A non-transitory computer readable medium having instructions encoded thereon that, when executed by a processing device, cause the processing device to:
perform for each of a plurality of entities:
select an entity communicatively coupled to a network;
determine a cyber-attack likelihood value and a cyber-attack impact value associated with the entity;
determine a cyber-attack risk based on the cyber-attack likelihood value and a cyber-attack impact value associated with the entity;
determine an operational failure likelihood value and an operational failure impact value associated with the entity;
determine an operational failure risk based on the operational failure likelihood value and the operational failure impact value associated with the entity;
determine a risk value for the entity based on the cyber-attack risk and the operational failure risk;
store the risk value for the entity; and
determine a risk value for a location based on the plurality of risk values associated with the plurality of entities; and
perform a remediation action based on the risk value for the location, wherein the remediation action comprises at least one of changing network access of the entity, initiating a patch for the entity, or updating the entity.

18. The non-transitory computer readable medium of claim 17, wherein the cyber-attack likelihood value is based on at least one of an alert, a vulnerability, a direct connection with a public entity, or a proximity to an infected or vulnerable entity.

19. The non-transitory computer readable medium of claim 17, wherein the cyber-attack impact value is based on at least one of entity criticality, network criticality, or proximity to a critical entity.

20. The non-transitory computer readable medium of claim 17, wherein the operational failure likelihood value is based on an alert.

21. The non-transitory computer readable medium of claim 17, wherein the operational failure impact value is based on at least one of an entity criticality, a network criticality, or proximity to a critical entity.

* * * * *